United States Patent
Be'ery et al.

(10) Patent No.: US 9,027,137 B2
(45) Date of Patent: *May 5, 2015

(54) AUTOMATIC GENERATION OF DIFFERENT ATTRIBUTE VALUES FOR DETECTING A SAME TYPE OF WEB APPLICATION LAYER ATTACK

(71) Applicant: Imperva, Inc., Redwood Shores, CA (US)

(72) Inventors: Tal Arieh Be'ery, Petach Tikva (IL); Nitzan Niv, Nesher (IL); Amichai Shulman, Tel Aviv (IL)

(73) Assignee: Imperva, Inc., Redwood Shores, CA (US)

( * ) Notice: Subject to any disclaimer, the term of this patent is extended or adjusted under 35 U.S.C. 154(b) by 123 days.

This patent is subject to a terminal disclaimer.

(21) Appl. No.: 13/948,156

(22) Filed: Jul. 22, 2013

(65) Prior Publication Data

US 2014/0317741 A1    Oct. 23, 2014

Related U.S. Application Data

(60) Provisional application No. 61/814,739, filed on Apr. 22, 2013.

(51) Int. Cl.
*G06F 11/00* (2006.01)
*H04L 29/06* (2006.01)
*H04L 29/08* (2006.01)

(52) U.S. Cl.
CPC ............... *H04L 63/14* (2013.01); *H04L 63/16* (2013.01); *H04L 63/30* (2013.01); *H04L 63/1408* (2013.01); *H04L 63/168* (2013.01); *H04L 63/20* (2013.01); *H04L 67/02* (2013.01)

(58) Field of Classification Search
CPC ........................ H04L 63/1416; H04L 63/1408

USPC ...................................................... 726/22–25
See application file for complete search history.

(56) References Cited

U.S. PATENT DOCUMENTS

2004/0177110 A1    9/2004  Rounthwaite et al.
2004/0255167 A1   12/2004  Knight
(Continued)

FOREIGN PATENT DOCUMENTS

EP    2009864 A1    12/2008
EP    2112800 A1    10/2009

OTHER PUBLICATIONS

"ThreatRader Reputation Services, Leverage Reputation Data to Stop Malicious Users and Automated Attacks," 2013, 2 pages, Imperva, downloaded from http://web.archive.org/web/20130325124848/http://www.imperva.com/download.asp?id=244 on Mar. 25, 2013.

(Continued)

*Primary Examiner* — Anthony Brown
(74) *Attorney, Agent, or Firm* — Nicholson De Vos Webster & Elliott LLP

(57) ABSTRACT

According to one embodiment, a computing device is coupled to a web application layer attack detector (AD), which itself is coupled between an HTTP client and a web application server. The computing device automatically learns a new condition to detect a first type of web application layer attack. Responsive receiving a web application layer message from the HTTP client that violates a rule for detecting the first type of web application layer attack, the AD transmits an alert package to the computing device, which uses the alert package, and optionally other alert packages, to automatically generate a new set of attribute values for each of a set of attribute identifiers to be transmitted to the AD or optionally other ADs for use in a different rule than the violated rule. The different rule is another attack specific rule for detecting the first type of web application layer attack.

20 Claims, 25 Drawing Sheets

(56) References Cited

U.S. PATENT DOCUMENTS

| | | | |
|---|---|---|---|
| 2005/0188222 A1 | 8/2005 | Motsinger et al. | |
| 2005/0188423 A1 | 8/2005 | Motsinger et al. | |
| 2005/0198099 A1 | 9/2005 | Motsinger et al. | |
| 2006/0104202 A1 | 5/2006 | Reiner | |
| 2006/0123083 A1 | 6/2006 | Goutte et al. | |
| 2006/0123479 A1 | 6/2006 | Kumar et al. | |
| 2007/0118894 A1 | 5/2007 | Bhatia | |
| 2007/0136809 A1* | 6/2007 | Kim et al. | 726/22 |
| 2009/0049547 A1 | 2/2009 | Fan | |
| 2009/0328187 A1 | 12/2009 | Meisel | |
| 2010/0125663 A1* | 5/2010 | Donovan et al. | 709/224 |
| 2010/0293616 A1 | 11/2010 | Young | |
| 2011/0016523 A1 | 1/2011 | Oh et al. | |
| 2011/0016526 A1 | 1/2011 | Oh et al. | |
| 2011/0099622 A1* | 4/2011 | Lee et al. | 726/13 |
| 2012/0117644 A1 | 5/2012 | Soeder | |
| 2012/0124661 A1 | 5/2012 | Lee et al. | |
| 2012/0180129 A1 | 7/2012 | Shulman et al. | |

OTHER PUBLICATIONS

"Web Application Security, Protect Your Critical Web Applications," 2013, 4 pages, Imperva, downloaded from http://web.archive.org/web/20130325124848/http:/www.imperva.com/download.asp?id=261 on Mar. 25, 2013.

"ThreatRadar Fraud Prevention, Stop Fraud Malware and Account Takeover Quickly and Easily," Apr. 23, 2013, 2 pages, Imperva.

"What Next Gen Firewalls Miss: 6 Requirements to Protect Web Applications," Apr. 5, 2013, 9 pages, Imperva.

"Imperva Sets a New Standard for Data Center Security with the Release of SecureSphere 10.0," Press Release, Apr. 23, 2013, 2 pages, Imperva, Inc.

"Imperva Report Demonstrates Importance of Crowd-Sourced Threat Intelligence," Press Release, Apr. 23, 2013, 2 pages, Imperva, Inc.

"Hacker Intelligence Initiative, Monthly Trend Report # 16, Get What You Give: The Value of Shared Threat Intelligence," Apr. 23, 2013, 11 pages, Imperva.

"The Future of Web Security: 10 Things Every Web Application Firewall Should Provide," 2012, 9 pages, Imperva.

"Blindfolded SQL Injection, Imperva White Paper," 2009, 11 pages, Imperva.

"Managing Risk to Sensitive Data with SecureSphere, Imperva White Paper," 2009, 12 pages, Imperva.

"The Industrialization of Hacking, Imperva White Paper," 2010, 6 pages, Imperva.

"The SecureSphere Web Application Firewall, An Accurate and Effective Approach to Protecting and Monitoring Web Applications, Imperva White Paper," 2008, 12 pages, Imperva.

"Security Trends for 2011, Imperva White Paper," 2010, 12 pages, Imperva.

"SQL Injection 2.0, Protecting Web Sites from Automated and Advanced SQL Injection," 2008, 11 pages, Imperva.

Notice of Allowance, U.S. Appl. No. 13/948,148, dated Feb. 12, 2015, 24 pages.

Basile et al., "Analysis of Application-Layer Filtering Policies with Application to HTTP," copyright 2013, IEEE, 14 pages.

Fu et al., "The Methodology and an Application to Fight against Unicode Attacks," copyright 2006, MIT, 11 pages.

Mirtalebi et al., "Enhancing Security of Web Service against WSDL Threats," copyright 2011, IEEE, 4 pages.

Xie et al., "Monitoring the Application-Layer DDoS Attacks for Popular Websites," copyright 2008, IEEE, 11 pages.

\* cited by examiner

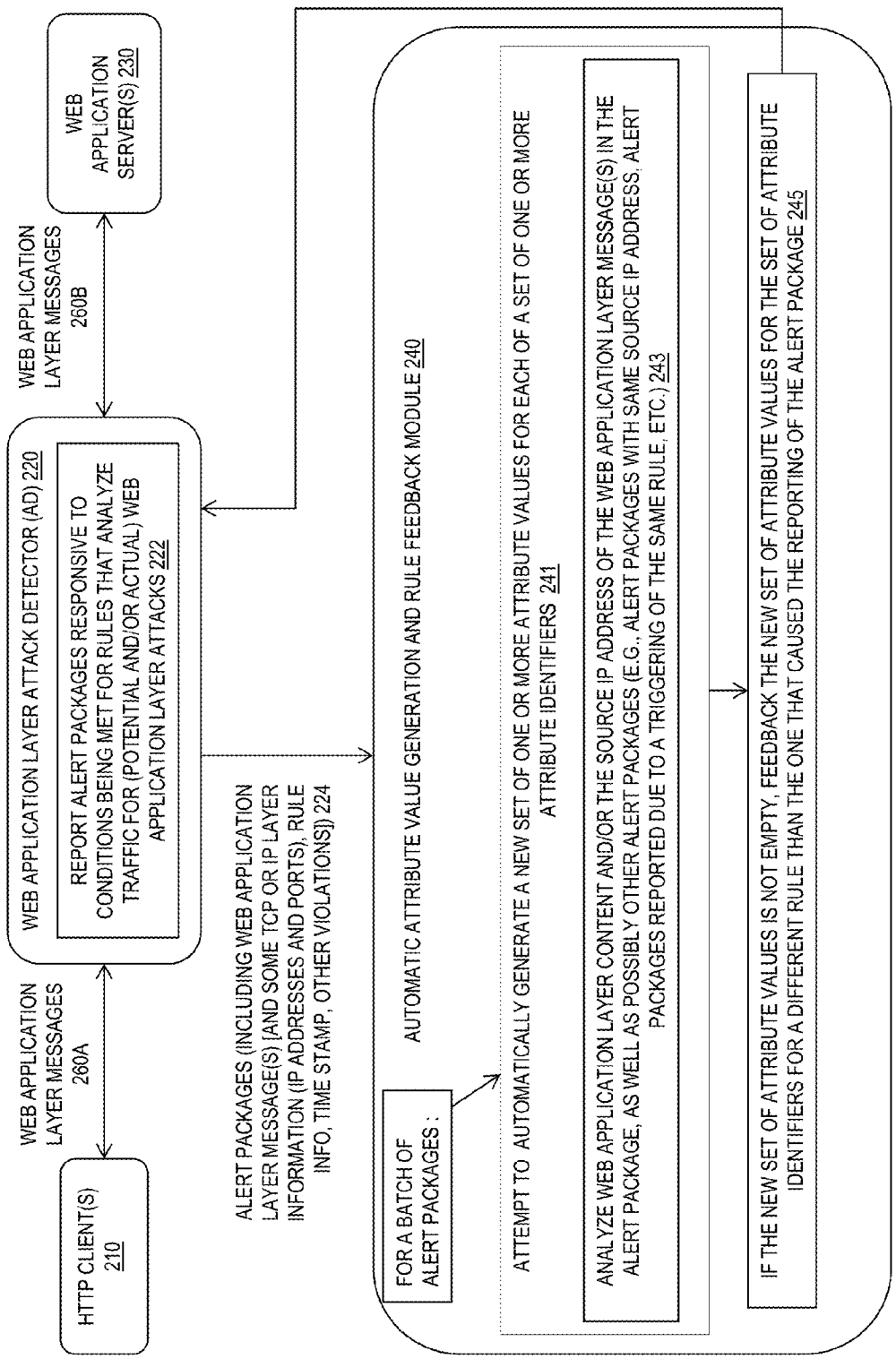

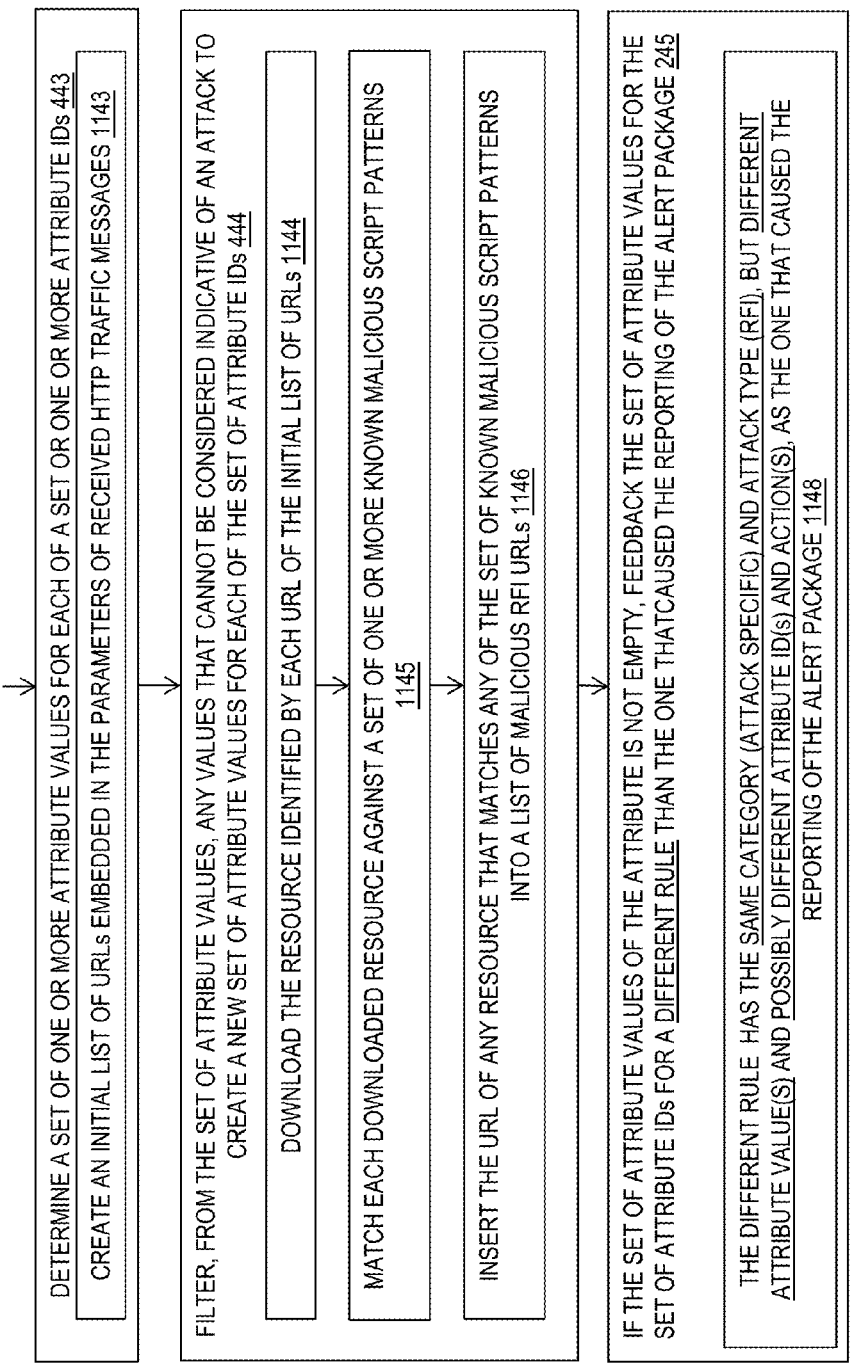

FIG. 12

CROSS SITE REQUEST FORGERY (CSRF) ATTACK METHOD

ALERT PACKAGE (INCLUDING WEB APPLICATION LAYER MESSAGE(S) [AND SOME TCP AND/OR IP LAYER INFORMATION (IP ADDRESSES AND PORTS), RULE INFO, OTHER VIOLATIONS]) REPORTED RESPONSIVE TO THE TRIGGERING OF A RULE THAT IS IN THE ATTACK SPECIFIC CATEGORY AND THAT IS FOR DETECTING CSRF ATTACKS 224A.2

↓

DETERMINE A SET OF ONE OR MORE ATTRIBUTE VALUES FOR EACH OF A SET OR ONE OR MORE ATTRIBUTE IDs 443

CREATE AN INITIAL LIST OF REFERER HTTP HEADERS EMBEDDED IN THE RECEIVED HTTP TRAFFIC MESSAGES 1243

↓

FILTER, FROM THE SET OF ATTRIBUTE VALUES, ANY VALUES THAT CANNOT BE CONSIDERED INDICATIVE OF AN ATTACK TO CREATE A NEW SET OF ATTRIBUTE VALUES FOR EACH OF THE SET OF ATTRIBUTE IDs 444

REMOVE ALL HTTP REFERER HEADERS FROM THE INITIAL LIST OF REFERER HEADERS THAT APPEAR IN A LIST OF ONE OR MORE KNOWN BENIGN REFERER HTTP HEADERS TO CREATE A LIST OF MALICIOUS CSRF REFERER HEADERS 1244

↓

IF THE NEW SET OF ATTRIBUTE VALUES OF THE ATTRIBUTE IS NOT EMPTY, FEEDBACK THE NEW SET OF ATTRIBUTE VALUES FOR THE SET OF ATTRIBUTE IDs FOR A DIFFERENT RULE THAN THE ONE THAT CAUSED THE REPORTING OF THE ALERT PACKAGE 245

THE DIFFERENT RULE HAS THE SAME CATEGORY (ATTACK SPECIFIC) AND ATTACK TYPE (CSRF), BUT DIFFERENT ATTRIBUTE VALUE(S) AND POSSIBLY DIFFERENT ATTRIBUTE ID(s) AND ACTION(S), AS THE ONE THAT CAUSED THE REPORTING OF THE ALERT PACKAGE 1248

AUTOMATIC GENERATION OF DIFFERENT ATTRIBUTE VALUES FOR DETECTING A SAME TYPE OF WEB APPLICATION LAYER ATTACK

CROSS-REFERENCE TO RELATED APPLICATIONS

This application claims the benefit of U.S. Provisional Application No. 61/814,739, filed Apr. 22, 2013, which is hereby incorporated by reference.

FIELD

Embodiments of the invention relate to the field of networks; and more specifically, to network security and the automatic generation of different attribute values for detecting a same type of web application layer attack.

BACKGROUND

The content of Hypertext Transfer Protocol (HTTP) messages is transmitted within the application layer ("Layer 7") of the Open Systems Interconnection (OSI) model (ISO/IEC 7498-1), and may also be referred to as web application layer data. The OSI model was developed to establish standardization for linking heterogeneous communication systems, and describes the flow of information from a software application of a first computer system to a software application of a second computer system through a communications network. The OSI model has seven functional layers including a physical link layer, a data link layer, a network layer, a transport layer, a session layer, a presentation layer, and an application layer. A few examples of application layer protocols include, but are not limited to, HTTP for web application communication, File Transfer Protocol (FTP) for file transmission, Internet Message Access Protocol (IMAP) and Post Office Protocol (POP) for email, Simple Mail Transfer Protocol (SMTP) for transmitting email, Internet Relay Chat (IRC) for real-time Internet text messaging, Session Initiation Protocol (SIP) for voice and video calling, and Network File System (NFS) for the remote access of files.

Another model detailing communications on the Internet is known as the Internet Protocol (IP) suite, and is sometimes referred to as "TCP/IP". In contrast to the OSI model, the Internet protocol suite is a set of communications protocols including four layers: a link layer, an internet layer, a transport layer, and an application layer. The link layer of the Internet protocol suite, which provides communication technologies for use in a local network, is often described as roughly analogous to a combination of the data link layer (layer 2) and physical layer (layer 1) of the OSI model. The internet layer (e.g., IP version 4 (IPv4), IP version 6 (IPv6)) of the Internet protocol suite, which provides for inter-networking and thus connects various local networks, is often described as roughly analogous to the network layer (layer 3) of the OSI model. The transport layer (e.g., Transmission Control Protocol (TCP), User Datagram Protocol (UDP)) of the Internet protocol suite, which allows for host-to-host communications, is often described as roughly analogous to the transport layer (layer 4) of the OSI model. Finally, the application layer of the Internet protocol suite includes the various protocols (e.g., HTTP, IMAP, FTP, SIP) for data communications on a process-to-process level, and is often described as analogous to a combination of the session, presentation, and application layers (layers 5-7, respectively) of the OSI model.

Regardless of the model considered, many common attacks are targeted at aspects of the network layer, the transport layer, and the application layer. The network layer, which is under the transport layer and routes data supplied by the transport layer, manages delivery of packets between computing devices that may be connected to different networks and separated by one or more other networks. The network layer is responsible for logical addressing, which includes managing mappings between IP addresses and computing devices on a worldwide basis. The network layer is also responsible for ensuring that packets sent to computing devices on different networks are able to successfully navigate through the various networks successfully and arrive at the proper intended destinations. Network devices such as routers and gateways predominantly operate at the network layer. The transport layer, which is under the application layer, provides end-to-end communication services by providing reliable delivery of an entire message from a source to a destination, sometimes using multiple packets. While the network layer typically handles each packet independently, the transport layer manages the relationships between the packets to ensure that the entire message arrives at the destination and can be reassembled in the correct order to recreate the original message. The application layer typically operates as the top layer in networking models and carries application-specific data, such as HTTP request and response messages.

Application layer attacks typically target web applications executed by web application servers (in which case, they are referred to as web application layer attacks). A web application server is system software (running on top of an operating system) executed by server hardware upon which web applications run. Web application servers may include a web server (e.g. Apache, Microsoft® Internet Information Server (IIS), nginx, lighttpd), which delivers web pages on the request of HTTP clients using HTTP, and may also include an application server that executes procedures (i.e., programs, routines, scripts) of a web application. Web application servers typically include web server connectors, computer programming language libraries, runtime libraries, database connectors, and/or the administration code needed to deploy, configure, manage, and connect these components. Web applications are computer software applications made up of one or more files including computer code that run on top of web application servers and are written in a language the web application server supports. Web applications are typically designed to interact with HTTP clients by dynamically generating HTML responsive to HTTP request messages sent by those HTTP clients. Many web applications utilize databases (e.g., relational databases such as PostgreSQL, MySQL, and Oracle, and non-relational databases, also known as NoSQL databases, such as MongoDB, Riak, CouchDB, Apache Cassandra and HBase) to store information received from HTTP clients and/or information to be displayed to HTTP clients.

HTTP clients interact with web applications by transmitting HTTP request messages to web application servers, which execute portions of web applications and return web application data in the form of HTTP response messages back to the HTTP clients, where the web application data may be rendered using a web browser. Thus, HTTP functions as a request-response protocol in a client-server computing model, where the web application servers typically act as the "server" and the HTTP clients typically act as the "client."

HTTP Resources are identified and located on a network by Uniform Resource Identifiers (URIs)—or, more specifically, Uniform Resource Locators (URLs)—using the HTTP or HTTP Secure (HTTPS) URI schemes. URLs are specific strings of characters that identify a particular reference available using the Internet. URLs typically contain a protocol identifier or scheme name (e.g. http, https, ftp), a colon, two slashes, and one or more of user credentials, server name, domain name, IP address, port, resource path, query string, and fragment identifier, which may be separated by periods and/or slashes. The original versions of HTTP—HTTP/0.9 and HTTP/1.0—were revised in Internet Engineering Task Force (IETF) Request For Comments (RFC) 2616 as HTTP/1.1, which is in common use today. A new version of the HTTP protocol, HTTP/2.0, is currently being developed by the Hypertext Transfer Protocol Bis (httpbis) working group of the IETF and is based upon the SPDY protocol. As HTTP/2.0 is expected to similarly utilize HTTP clients and HTTP request messages, the ideas discussed herein should largely (if not entirely) remain applicable to HTTP/2.0.

By way of an operational example, an HTTP client requests a web page from a web application server by sending it an HTTP request message. For example, to access the web page with a URL of "http://www.example.org/index.html", web browsers connect to the web application server at www.example.org by sending it an HTTP request message using a "GET" method, which looks like the following:
GET /index.html HTTP/1.1
Host: www.example.org The web application server replies by sending a set of HTTP headers along with the requested web page, which collectively is called an HTTP response message.

A HTTP message may include request lines, status lines, HTTP headers, a message body, and/or a trailer. Request lines, which are used in HTTP/1.1 request messages, include a method token field that identifies a method to be performed (e.g., "GET", "POST"), a Request URI field that identifies a URI of a resource upon which to apply the method (i.e., a requested URL), and a protocol version field (e.g., "HTTP/1.1"). Status lines, which are used in HTTP/1.1 response messages, include a protocol version field, a numeric status code field (e.g., 403, 404), and an associated textual explanatory phrase field (e.g., "Forbidden", "Not Found"). HTTP headers define the operating parameters of an HTTP transaction, and each HTTP header typically comprises a colon-separated name-value pair.

One type of HTTP header is a "Referer" header that allows a web browser to specify, for a web application server's benefit, an address (e.g., URI) of a resource (e.g., web page) from which the requested URI was obtained. For example, if a user clicks on a link from within a web page having a URI of "http://www.example.com/index.html", the resulting HTTP request message sent by the web browser may include a Referer header of "Referer: http://www.example.com/index.html" indicating that the HTTP request message was originated from that web page. Another type of HTTP header is a "User-Agent" header that indicates, for the web application server's benefit, what software and/or modules are utilized by the HTTP client making the request. For example, a User-Agent header may include one or more of a web browser product name and version number, a layout engine name and version number used by the web browser, an identifier of the type of machine and/or operating system of the user, and/or names of any extensions utilized by the web browser. For example, a User-Agent header transmitted from the Mozilla® Firefox® web browser executing on a computer utilizing the Microsoft® Windows® 7 operating system may be "Mozilla/5.0 (Windows; U; Windows NT 6.1; ru; rv:1.9.2) Gecko/20100115 Firefox/3.6". A core set of HTTP fields for "HTTP/1.1" is standardized by the IETF in RFC 2616, and other updates and extension documents (e.g., RFC 4229). Additional field names and permissible values may be defined by each application.

HTTP parameters are typically short pieces of data (i.e., attribute name and attribute value pairs) that are sent from the HTTP client to the web application server. HTTP parameters may be sent a variety of ways, such as including them in the Request URI of the request line of an HTTP request message utilizing the HTTP "GET" method (i.e., by tacking them on the end of the Request URI as a "query string"), or by including them in the message body of the HTTP request message when using the HTTP "POST" method. In principle, the HTTP GET method requests the contents of a particular URL, while the HTTP POST method "sends" data to a particular URL. By way of example, assume the below HTML form is provided to the HTTP client as part of a web page:

```
<form action="http://www.examplesite.com/login" method="get">
<input type=text name="username">
<input type=submit>
</form>
```

Responsive to this HTML form being displayed, a user may enter the username "mcjones" and submit this form, which causes the HTTP request parameter "?username=mcjones" to be tacked on the end of the URL to form http://www.examplesite.com/login?username=mcjones. In this example, "username" is deemed a field name or attribute name or attribute identifier, and "mcjones" can be deemed a user-entered value of the field/attribute or an attribute value.

In addition to sending user-submitted form data, HTTP request messages may also be used for other purposes, including: 1) to send data via some Application Programming Interface (API) to call a web application server; and 2) to send data to AJAX (Asynchronous JavaScript and XML) web applications. While formerly any user action required a web page to be reloaded from the web application server, AJAX allows an HTTP client to retrieve data from the web application server asynchronously in the background without interfering with the display and behavior of the existing page. For example, an AJAX call may load new content into a web page after the initial rendering of the page without having to reload or "refresh" the page (i.e., transmit another HTTP request for the web page and/or render the entire page once again).

Structured Query Language (SQL) is a special-purpose programming language allowing for declarative querying of data (typically) contained in a relational database. Relational databases model data storage using one or more tables having columns and rows storing values associated with the columns. Most SQL implementations include data insert commands (e.g., INSERT), query commands (e.g., SELECT), update commands (e.g., UPDATE), and delete (e.g., DELETE) commands, as well as schema creation, schema modification, and data access control commands. While relational databases are often referred to as SQL databases, other types of (non-relational) databases exist that are often referred to as NoSQL databases.

Many web applications utilize databases, both relational and non-relational, to store and provide data used by the web application, including but not limited to user data (passwords, user names, contact information, credit card information, web application history, etc.) and other site-specific data including but not limited to stories, comments, pictures, product information, sales information, financial records, and any other type of information utilized by or displayed by a web application. Because these databases often store confidential or private information, the databases are often configured to only provide access to the data stored therein to a limited number of users, geographic locations, and/or computing devices. For example, many databases are configured to only allow access to a particular web application server.

However, due to the sensitive and important data in these databases, they are often targeted by third parties seeking unauthorized, and possibly malicious, access. For example, attackers may attempt to perform SQL Injection (SQLi) attacks (a form of web application layer attack, which is a form of application layer attack) by sending carefully crafted HTTP request messages to a web application server that may cause the web application to interact with its database under the direction of the attacker. While SQL injection attacks can be prevented through careful construction of web applications—for example, by validating and/or sanitizing (e.g., escaping) input provided to the web application by its users—such careful construction is not always used during the construction of all web applications.

In addition to SQLi attacks, many other types of attacks target web applications and web application users. For example, Cross-Site Request Forgery (CSRF) attacks work by abusing the trust between a web application and a particular client to perform an application level transaction on behalf of the attacker using the identity of the client. Further, attackers may use Remote File Inclusion (RFI) attacks that target web application servers, Cross-Site Scripting attacks, Clickjacking attacks (i.e., User Interface Redress Attacks), and many other web application layer attacks. Web application layer attacks typically come from outside a network (e.g. a Local Area Network (LAN)) and are directed at one or more computing devices within that network. For example, SQL injection attacks are typically directed at web applications and databases executing on computing devices located within a LAN and come from computing devices located outside the LAN.

Given this reality, security devices (sometimes called web application firewalls) are commonly utilized to look for and prevent such attacks within HTTP traffic (i.e. web application layer traffic).

FIG. 1 is a diagram illustrating aspects of security rules for detecting attacks of certain attack types existing in the prior art according to certain embodiments of the invention. In FIG. 1, a set of rules 150 is illustrated that can be utilized in an attack detector or other type of firewall type module for examining network traffic (e.g., packets). While each of the rules 150 may be implemented in a variety of ways known to those of skill in the art, the rules 150 are conceptually presented herein as including several distinct aspects. First, each rule includes a rule identifier (ID) 100, which serves to uniquely identify a particular rule. Each rule ID 100 can be a unique set of bits or characters serving as a "key" to the set of rules 150, and in many systems the rule IDs 100 are integer values, string values (sets of one or more characters), or even combinations of other aspects of the rules. In some systems, however, an explicit rule ID 100 is not necessary.

The set of rules 150 also includes a set of one or more conditions 108 that define what to look for in traffic, and a set of one or more actions 106 to be performed when a condition 108 is met. The condition 108 includes, for each rule, one or more attributes 107. An attribute 107 is a combination of an attribute identifier 102 and a set of one or more attribute values 104. An attribute identifier 102 serves to identify how to determine a particular attribute value to be examined. Attribute identifiers 102 can identify particular protocol headers (e.g., a TCP header, an HTTP header) and/or header fields (e.g., a source or destination port of a TCP header, a Referer HTTP header field) used within a packet. Attribute identifiers 102 can also identify metrics or characteristics of traffic that an attribute value 104 represents. For example, an attribute identifier 102 may be a number of packets or HTTP messages received over a defined period of time, and the corresponding attribute value 104 may be that particular number of packets or HTTP messages. Of course, the use of metrics or characteristics as attribute identifiers 102 requires that the system have some way of determining the attribute values 104, perhaps by maintaining a separate table or database (not pictured) with relevant data necessary to perform the computation. Attribute identifiers 102 may also identify portions of application layer data carried by packets, such as an HTTP request message, an HTTP response message, a SQL query, etc. Each of the rules 150 may include one or more attribute IDs 102, and for each of the attribute IDs 102, a set of one or more attribute values 104. In some systems, each rule may also include detection logic 101 describing how the attribute identifiers 102 and attribute values 104 are to be used. For example, in some systems the detection logic 101 defines logic statements to define the relations within a pair of attribute IDs 102 and associated sets of attribute values 104 (e.g., only one of the values 104 must be found, all of the values 104 must be found, or none of the values 104 must be found), and/or to define the relations between different pairs of attribute IDs 102 and associated attribute values 104 (e.g., a first ID-value pair must be true AND a second ID-value pair must be true, a first ID-value pair must be true OR a second ID-value pair must be true). In some systems, the detection logic 101 instead defines how to find the portions of the traffic identified by the attribute identifiers 102. However, in some systems, the detection logic 101 and attributes 107 (including attribute identifiers 102 and associated attribute values 104) are combined into fewer fields.

Each of the rules 150 is also depicted as including one or more actions 106 to be performed when the condition 108 of the rule is satisfied. Actions 106 can indicate one or more forwarding actions (e.g., drop the packet or message, temporarily hold the packet or message for further analysis, transmit the packet or message to a particular module or IP address, forward the packet or message to the intended destination) or modification actions (e.g., insert a value into the packet or message at a particular location, strip out a value from the packet or message, replace a value in the packet or message, etc.). The actions 106 can also include instructions describing what information is to be placed into each alert package; for example, an action may direct that an attack type indication of "RFI attack" is to be included therein. Additionally, many other types of actions are well known to those of ordinary skill in the art, and thus these examples are not exhaustive.

In some systems, the rules 150 utilized by computing devices for security purposes may be described as detecting a particular type of attack and thus have an attack type 130. For example, a first rule 110 may detect SQLi attacks and be of a SQLi attack type, a second rule 112 may detect RFI attacks and be of an RFI attack type, a third rule 114 may detect denial of service (DoS) attacks and be of a DoS attack type, and a fourth rule 116 may detect CSRF attacks and thus be of a CSRF attack type.

SUMMARY

According to an embodiment of the invention, a method in a computing device communicatively coupled to a web application layer attack detector (AD) is described. The AD is communicatively coupled between a Hypertext Transfer Protocol (HTTP) client and a web application server to protect the web application server against web application layer attacks. The AD applies rules that each comprise a condition including a set of one or more attributes, wherein each of the set of attributes includes an attribute identifier and a set of one or more attribute values. The method includes automatically learning a new condition to detect a first type of web application layer attack by receiving, from the AD, an alert package comprising a web application layer request message sent by the HTTP client to the web application server. The alert package was sent responsive to a set of one or more packets that collectively carried the web application layer request message and that resulted in the condition of one of the rules being met. The one of the rules is an attack specific rule that relies on a set of attribute values that is indicative of the first type of web application layer attack. The set of packets are sent utilizing a protocol stack including the application layer that carries web application layer messages, a transport layer under the application layer to provide end-to-end communication services, and a network layer under the transport layer to route data supplied by the transport layer. The automatically learning also includes automatically generating, using the received alert package, a new set of one or more attribute values for each of a set of one or more attribute identifiers. The automatically learning also includes transmitting, for delivery to the AD, the new set of attribute values for each of the set of attribute identifiers to form the new condition for a different rule than the one of the rules that caused the sending of the alert package. The new condition for the different rule is to be used in the AD's protection of the web application server against web application layer attacks from the HTTP client or any other HTTP client. The different rule is another attack specific rule that relies on the new set of attribute values for the set of attribute identifiers that is indicative of the first type of web application layer attack.

In another embodiment of the invention, a computing device is described that is to be communicatively coupled to a web application layer attack detector (AD), which itself is to be communicatively coupled between Hypertext Transfer Protocol (HTTP) clients and a set of one or more web application servers to protect the set of web application servers against web application layer attacks. The AD is to apply rules that each comprise a condition including a set of one or more attributes, wherein each of the set of attributes includes an attribute identifier and a set of one or more attribute values. The computing device includes a set of one or more network interfaces and an automatic attribute value generation and rule feedback module (AVGRFM). The AVGRFM is to be coupled to the set of network interfaces and configured to automatically learn new conditions to detect a first type of web application layer attack. The AVGRFM includes an alert package reception module, an attribute value generation module, and a feedback module. The alert package reception module is configured to receive, from the AD, alert packages that each comprise a web application layer request message sent by one of the HTTP clients to one of the web application servers. The alert packages are to each be sent responsive to a set of one or more packets that collectively carried the web application layer request message and that result in the condition of one of the rules being met. The one of the rules is an attack specific rule that relies on a set of attribute values that is indicative of the first type of web application layer attack. Each of the sets of packets are to be sent utilizing a protocol stack including the application layer that carries web application layer messages, a transport layer under the application layer to provide end-to-end communication services, and a network layer under the transport layer to route data supplied by the transport layer. The attribute value generation module is configured to automatically generate, using the received alert packages, new sets of one or more attribute values for sets of one or more attribute identifiers. The feedback module is configured to transmit, for delivery to the AD, the new sets of attribute values for the sets of attribute identifiers to form the new conditions for different rules than the attack specific rules that caused the sending of the alert packages. The new conditions for the different rule are to be used in the AD's protection of the web application servers against web application layer attacks from the HTTP clients or any other HTTP client. The different rules are additional attack specific rules that are to rely on the new sets of attribute values for the sets of attribute identifiers that are indicative of the first type of web application layer attack.

Embodiments of the invention allow for automatic detection of continuously-changing attack variants and other "zero-day" attacks, and for the automatic creation of new security rules to prevent their use, and thus nearly eliminate the existence of "vulnerability windows" wherein applications and networks are vulnerable to new attacks during the portion of time between the first use of the new attack and the ultimate implementation of protections against the attack. In an embodiment, based upon a triggering of an attack specific rule that detects a first type of attack, a new set of attribute values can be automatically generated for a different attack specific rule that also detects the first type of attack.

BRIEF DESCRIPTION OF THE DRAWINGS

The invention may best be understood by referring to the following description and accompanying drawings that are used to illustrate embodiments of the invention. In the

DRAWINGS

Figure 1:
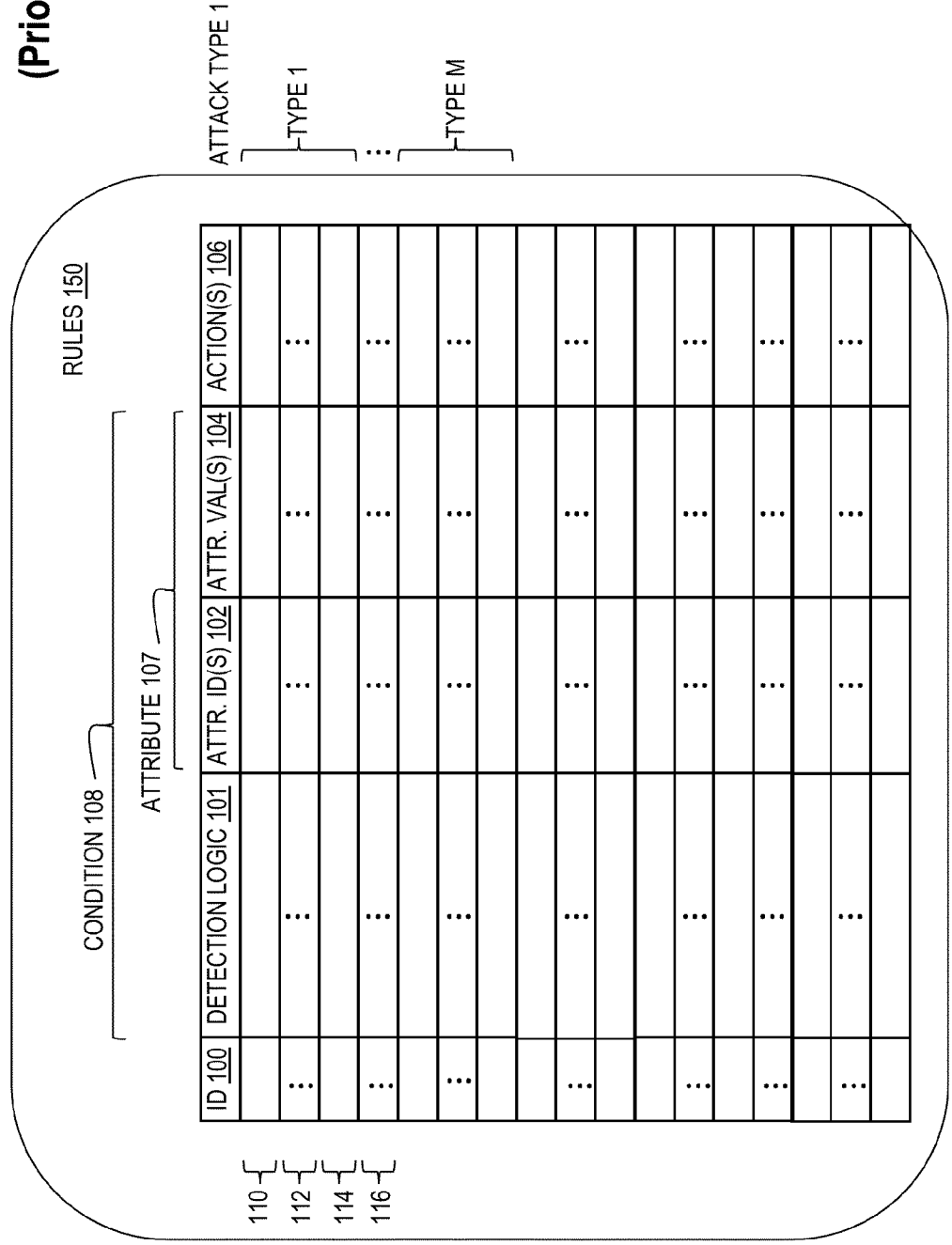
Figure 3A:
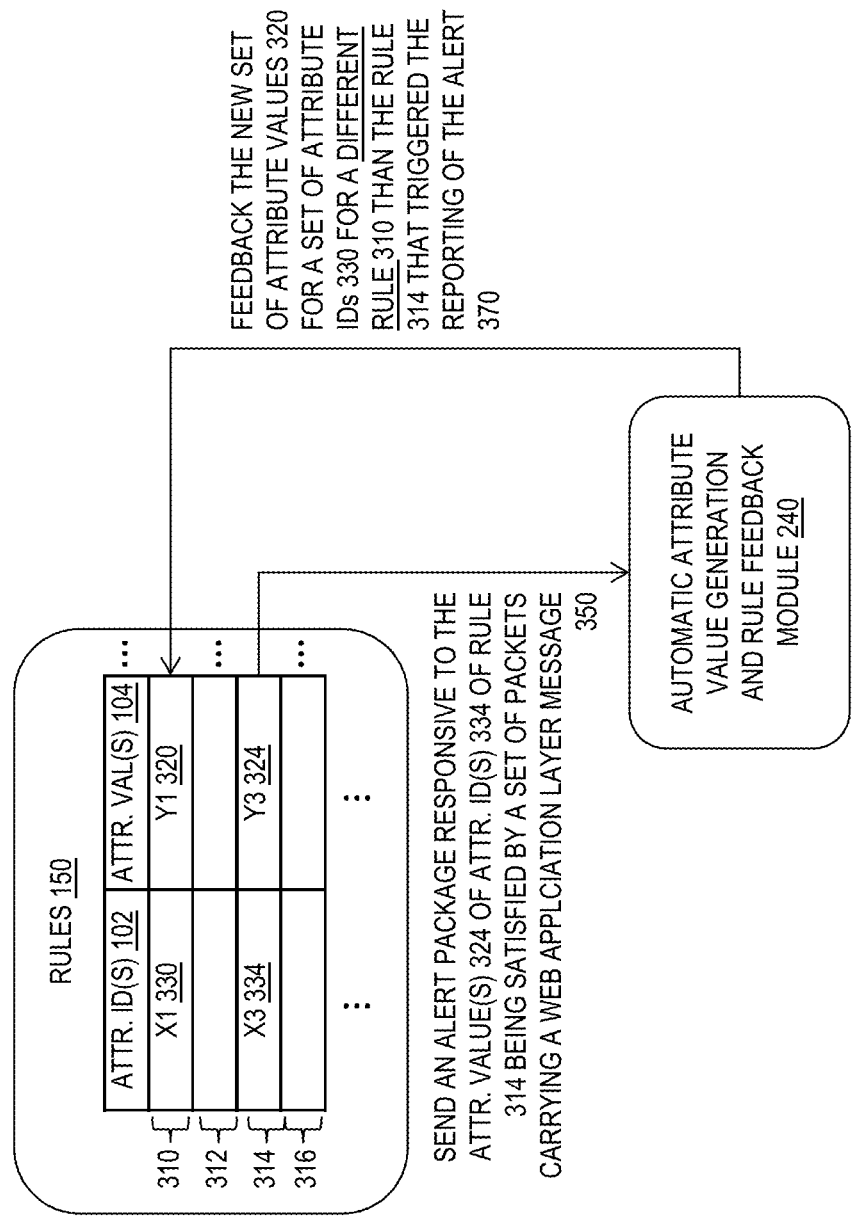
Figure 3B:
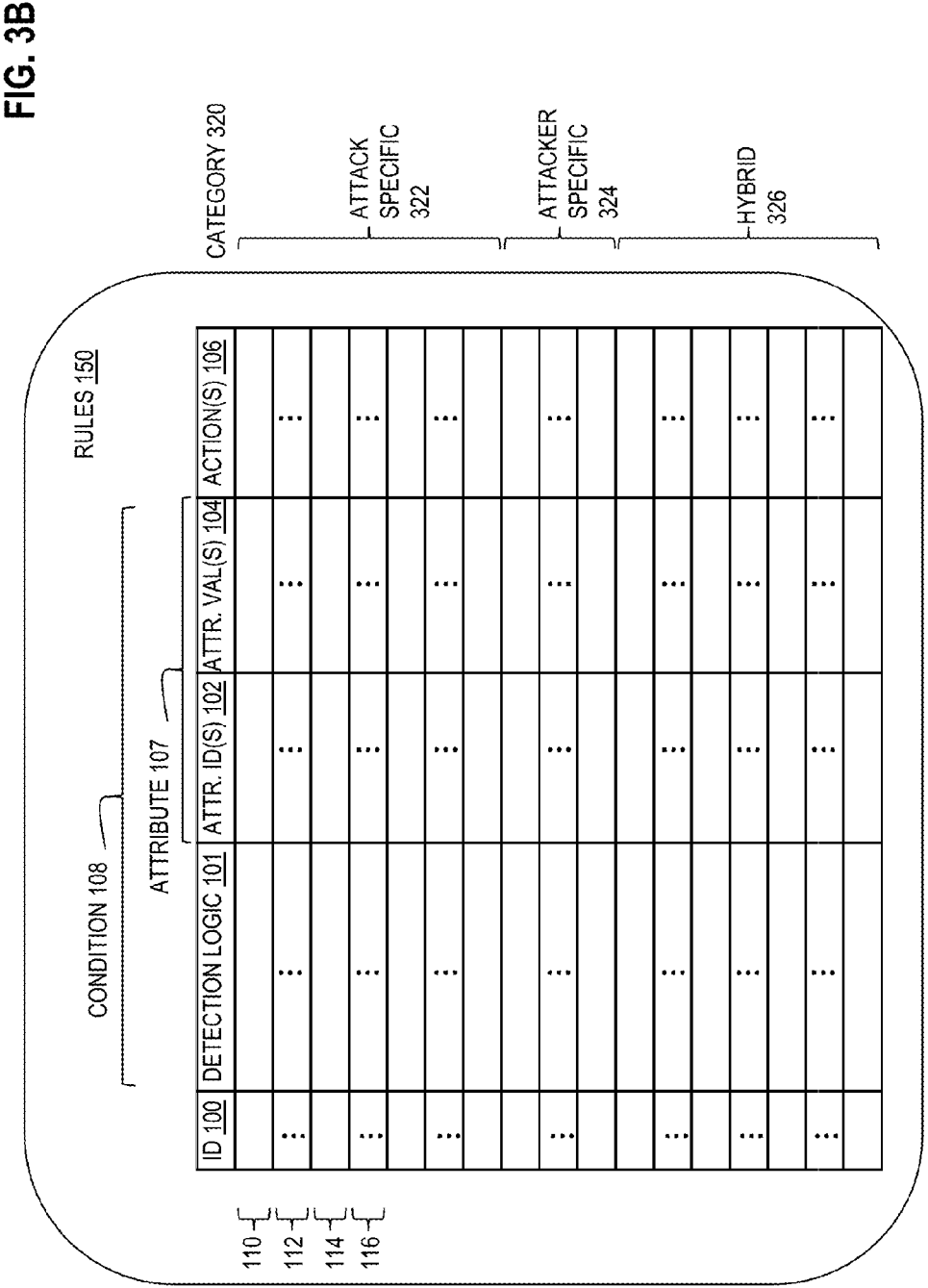
Figure 4:
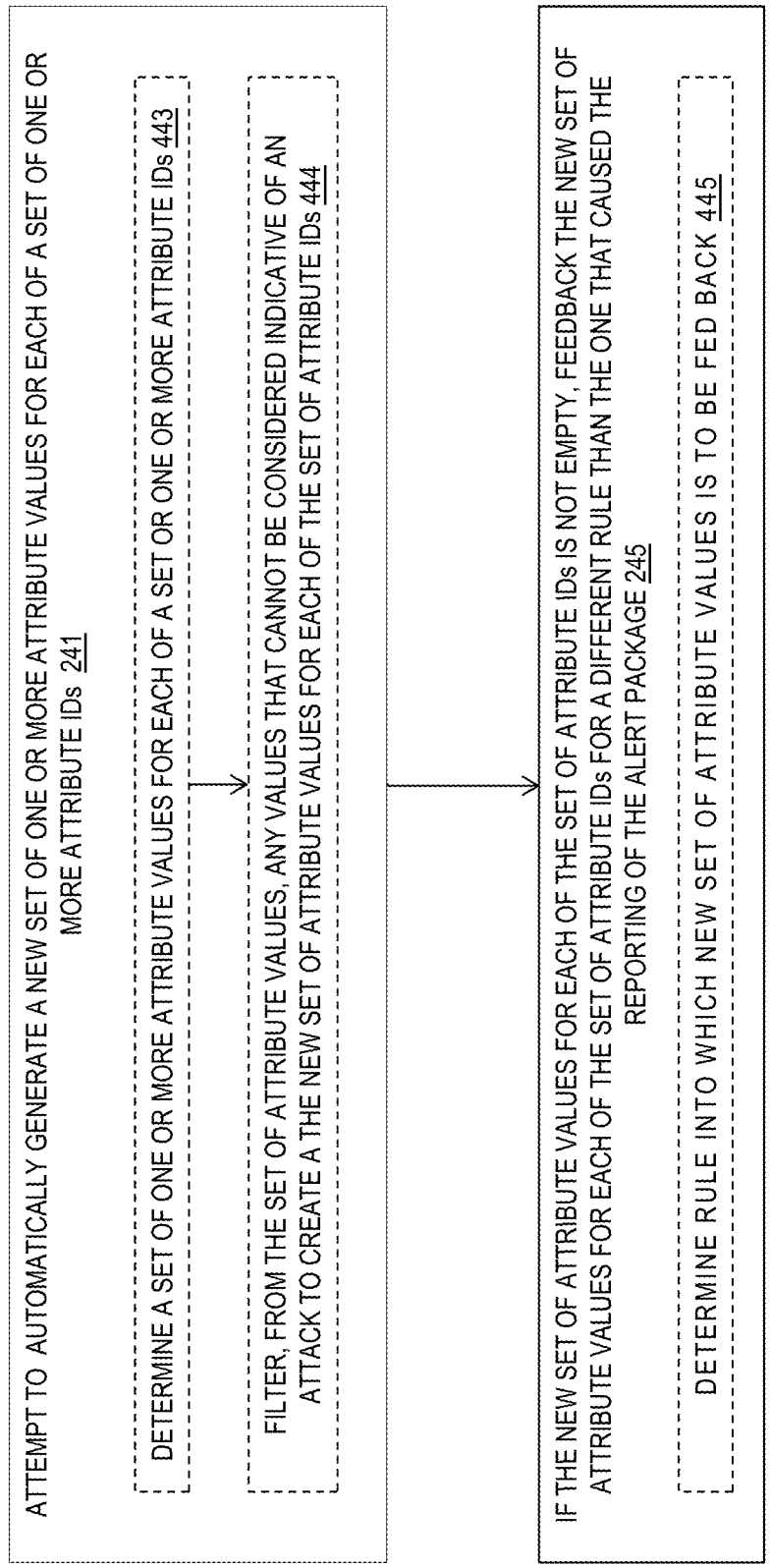
Figure 5:
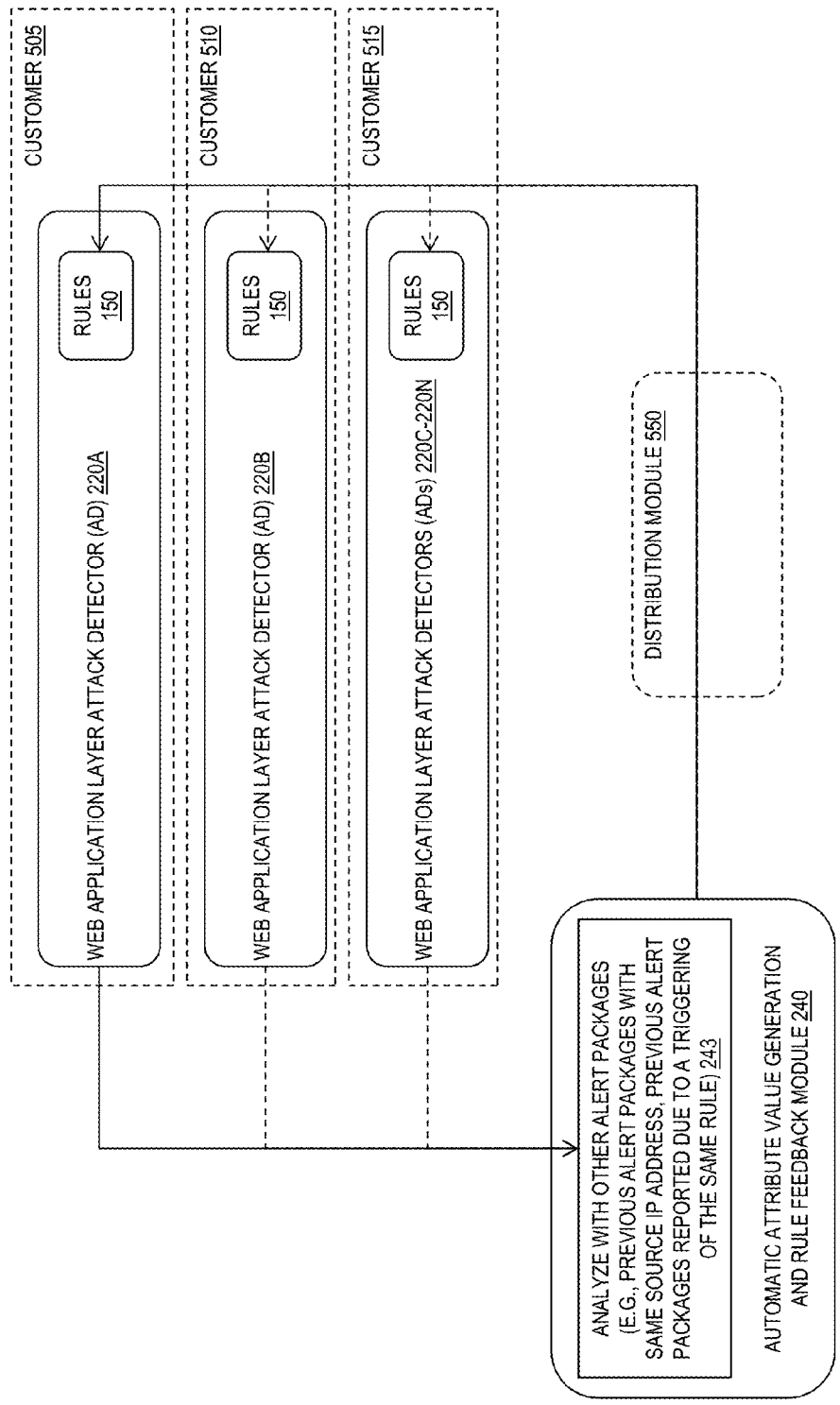
Figure 6:
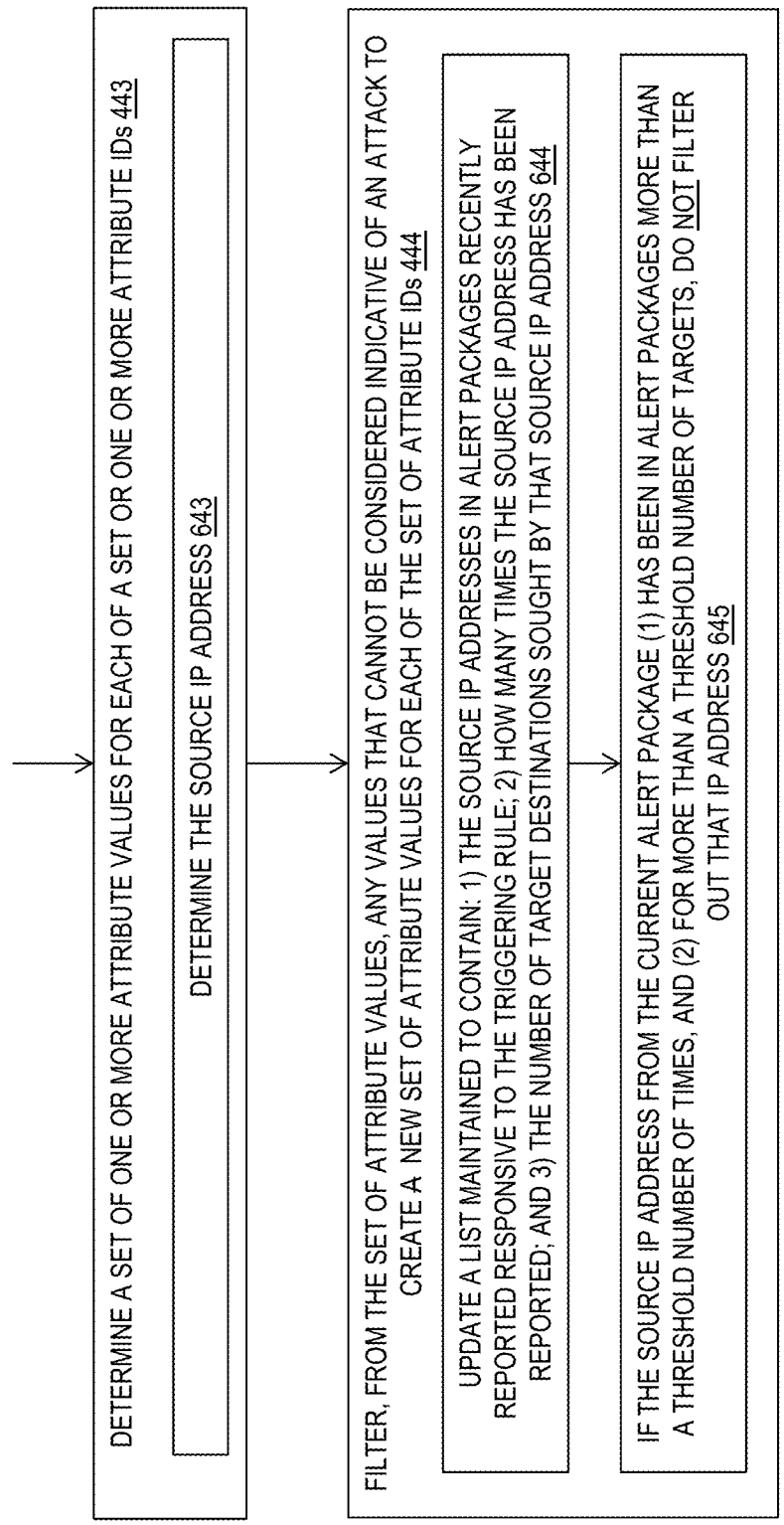
Figure 7:
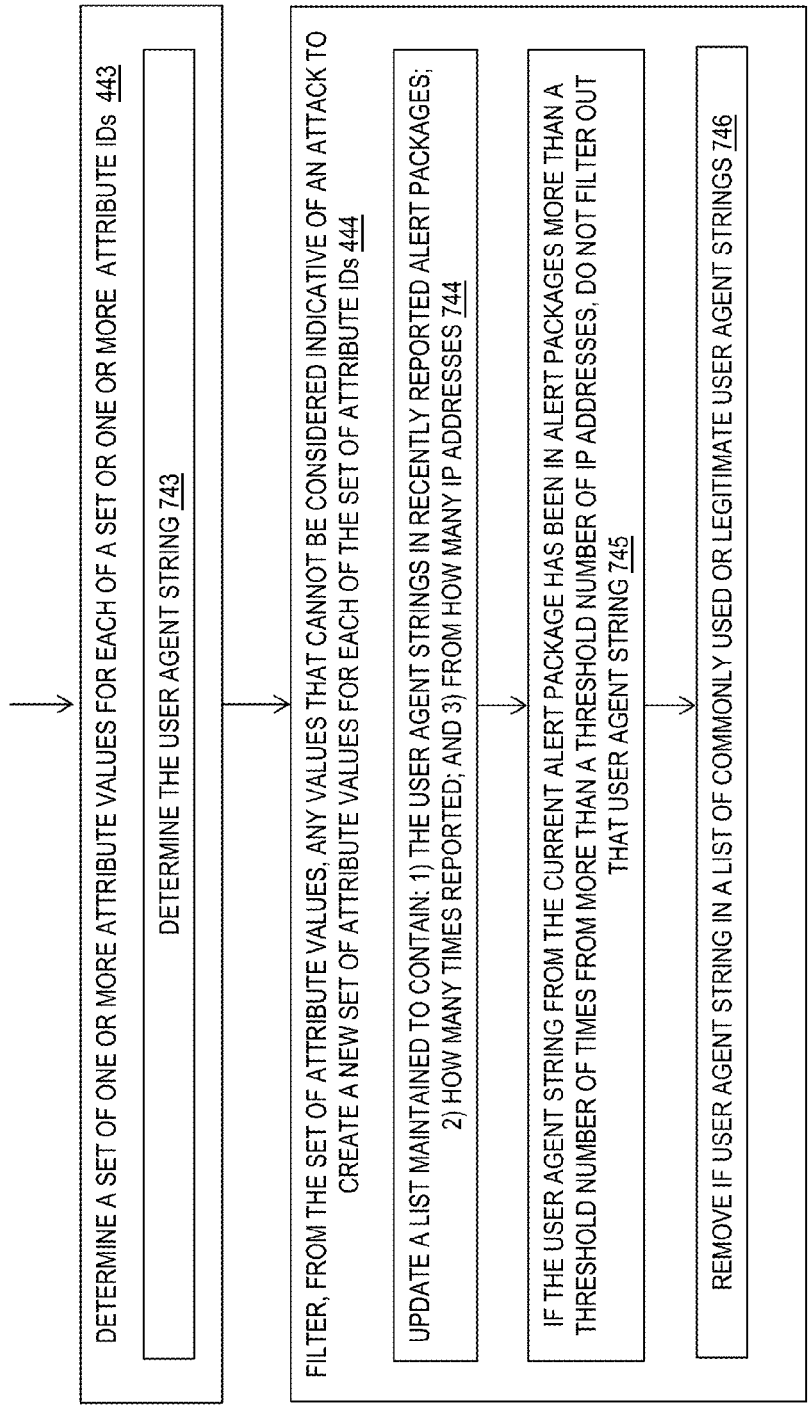
Figure 8:
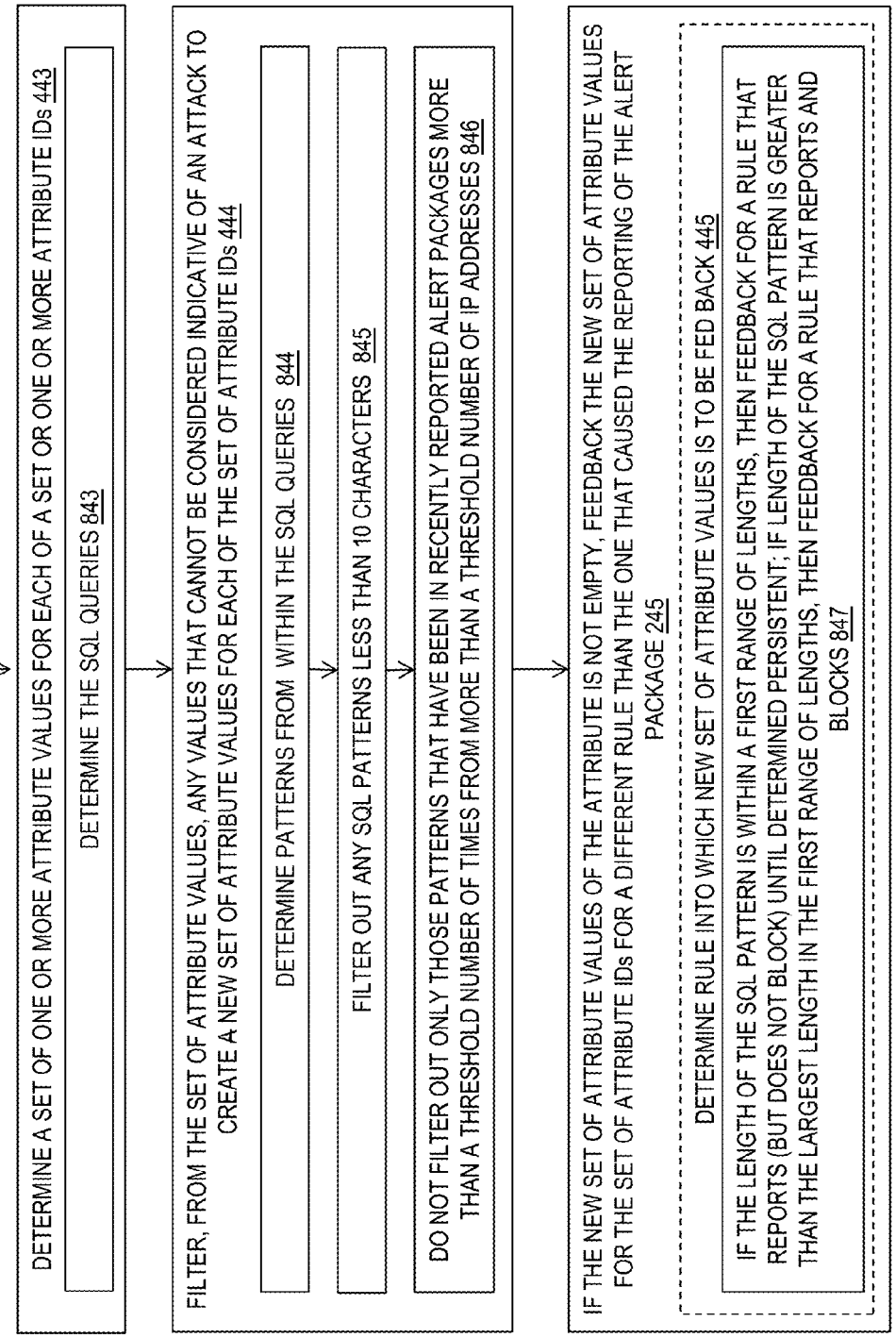
Figure 9:
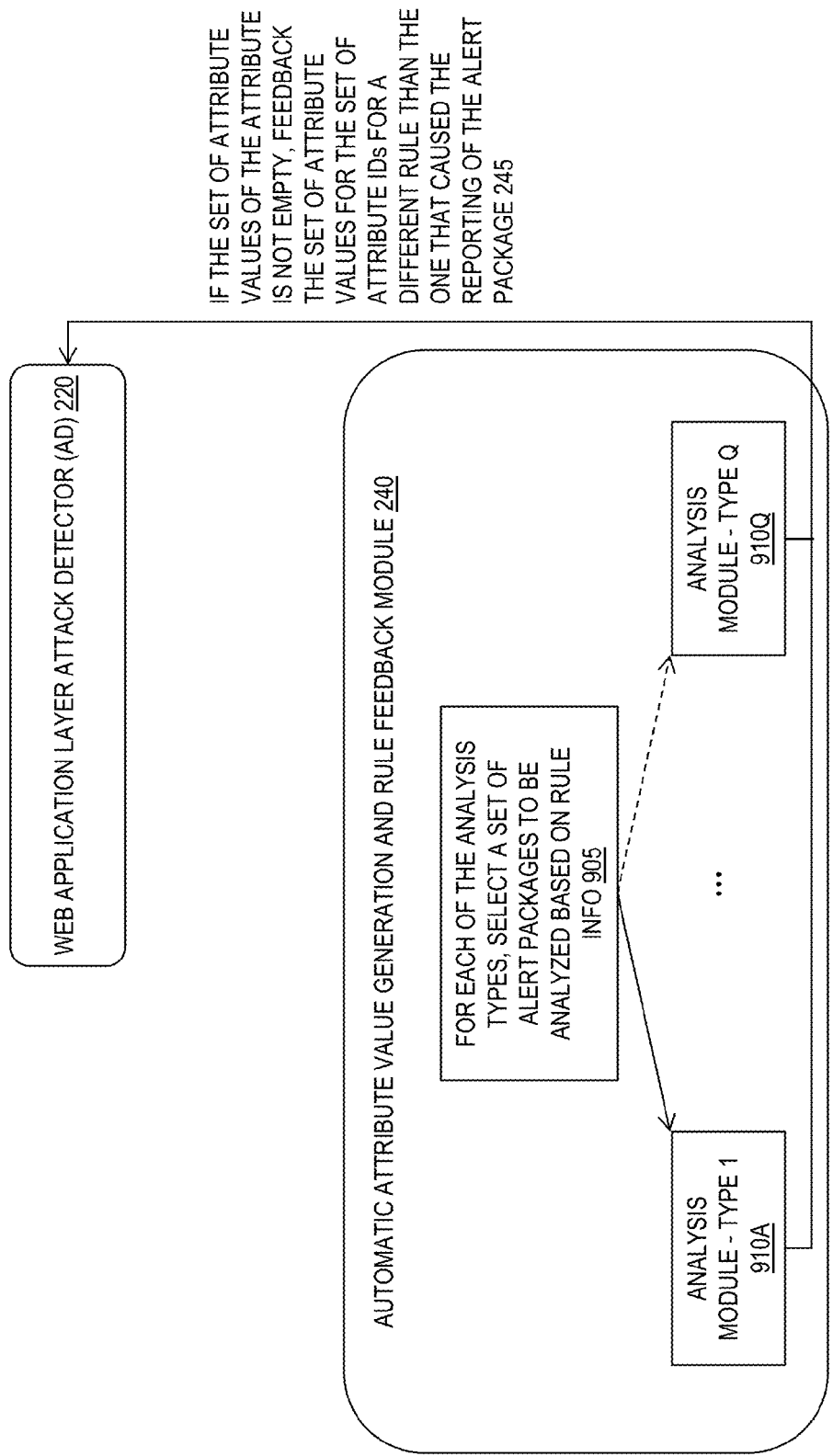
Figure 10:
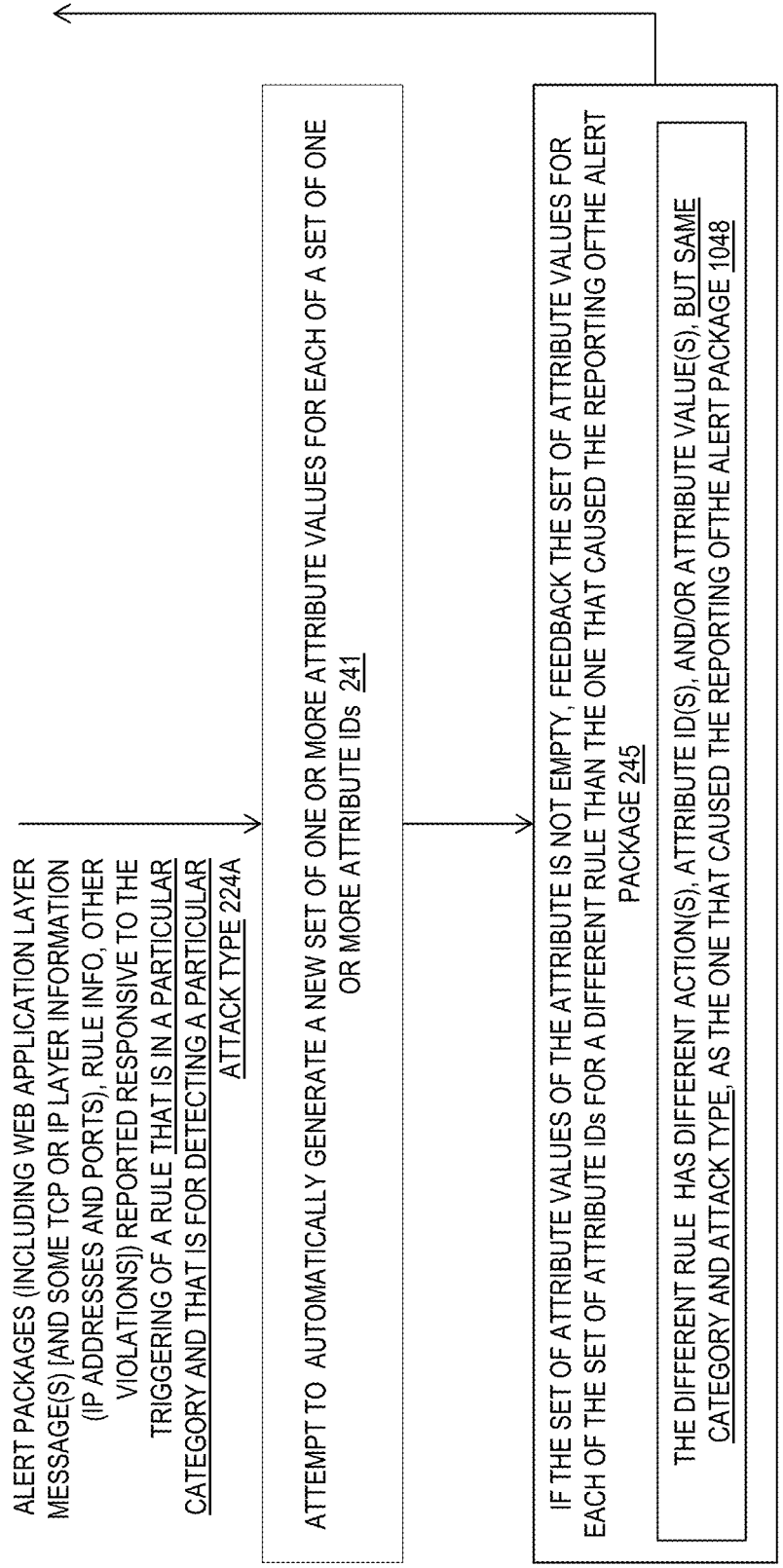
Figure 13:
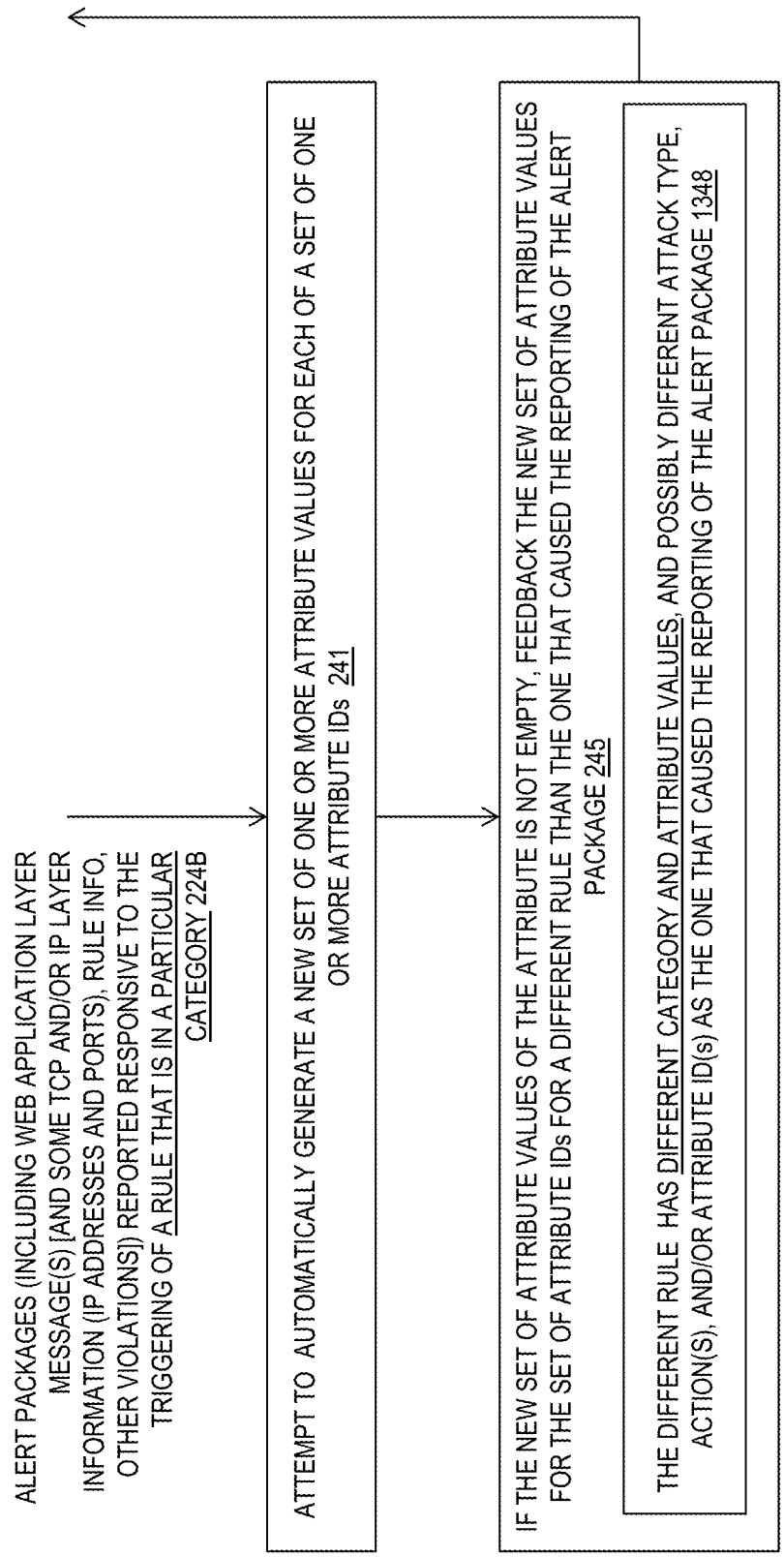
Figure 14:
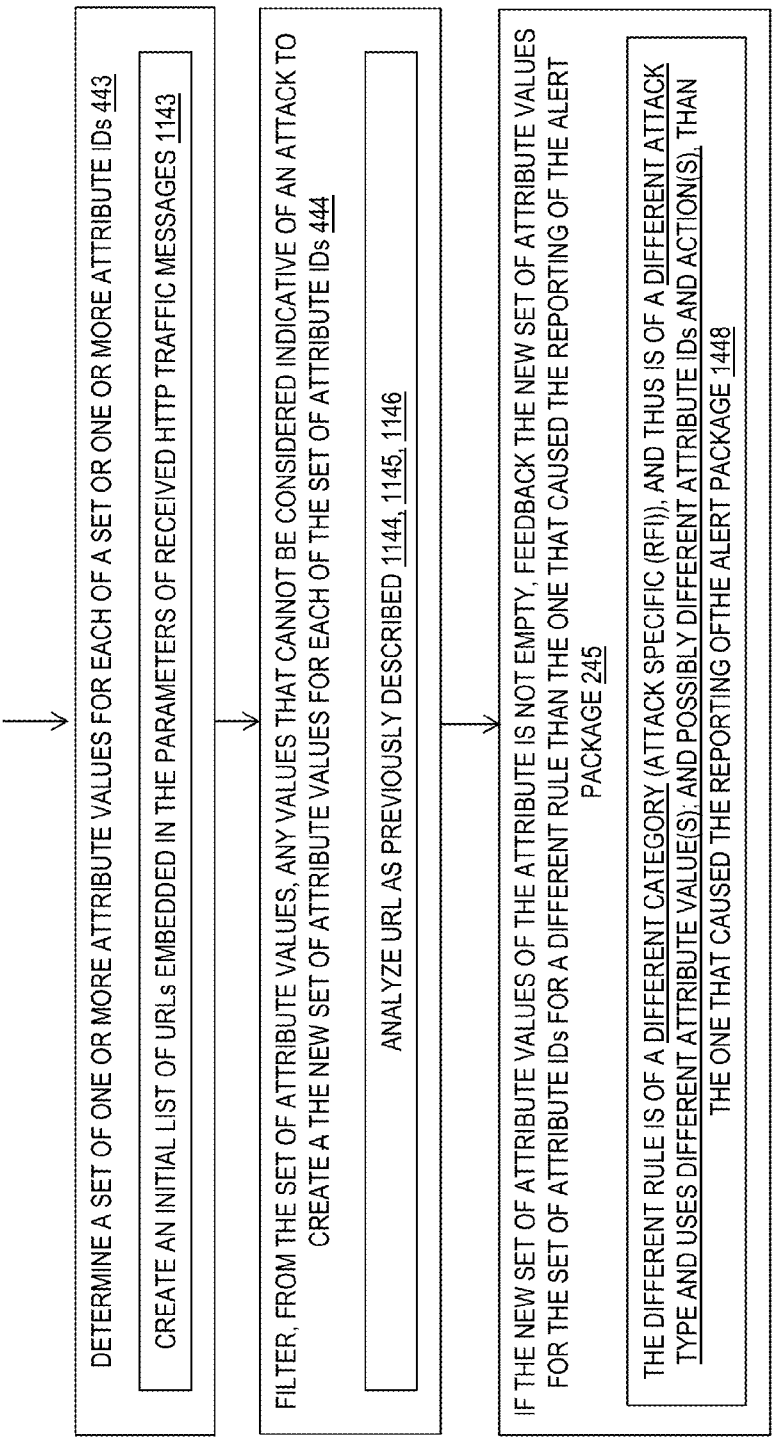
Figure 15:
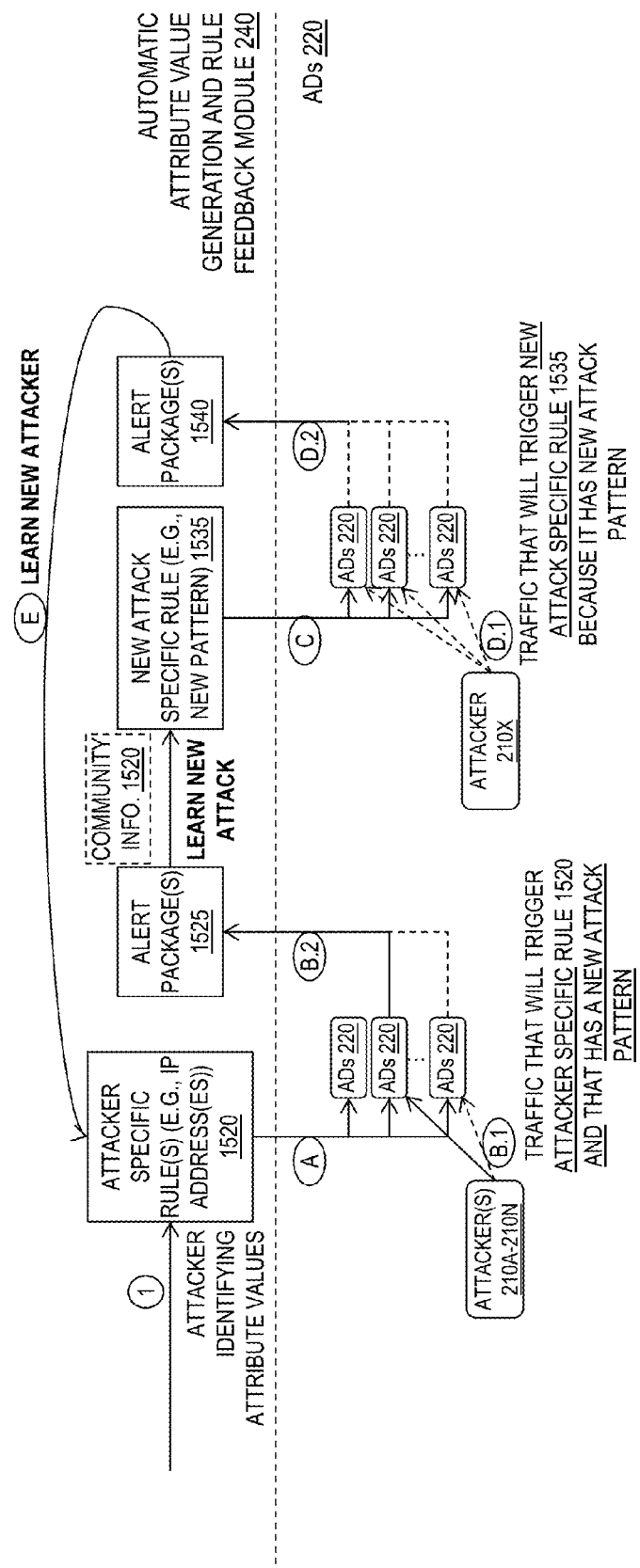
Figure 16:
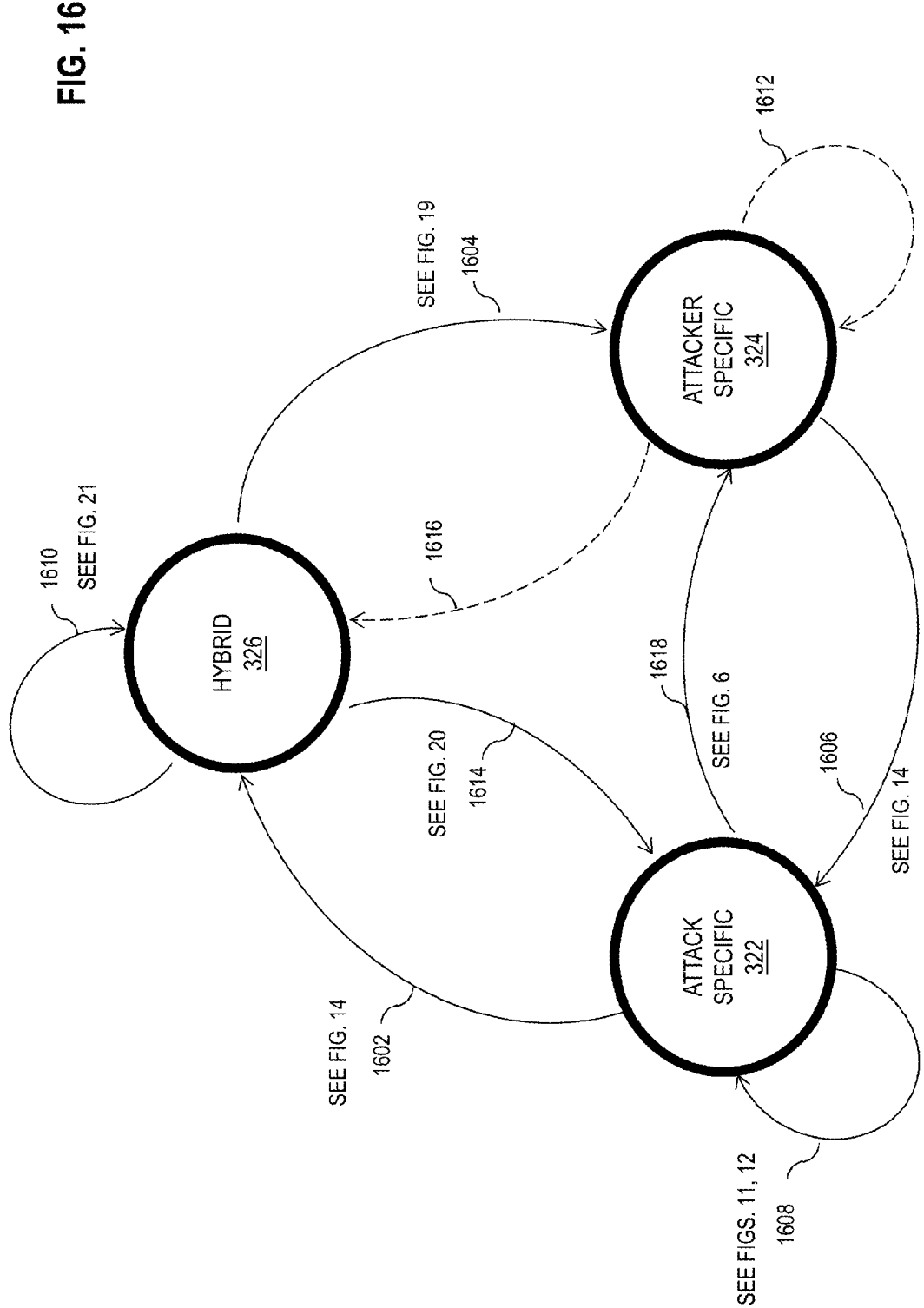
Figure 17:
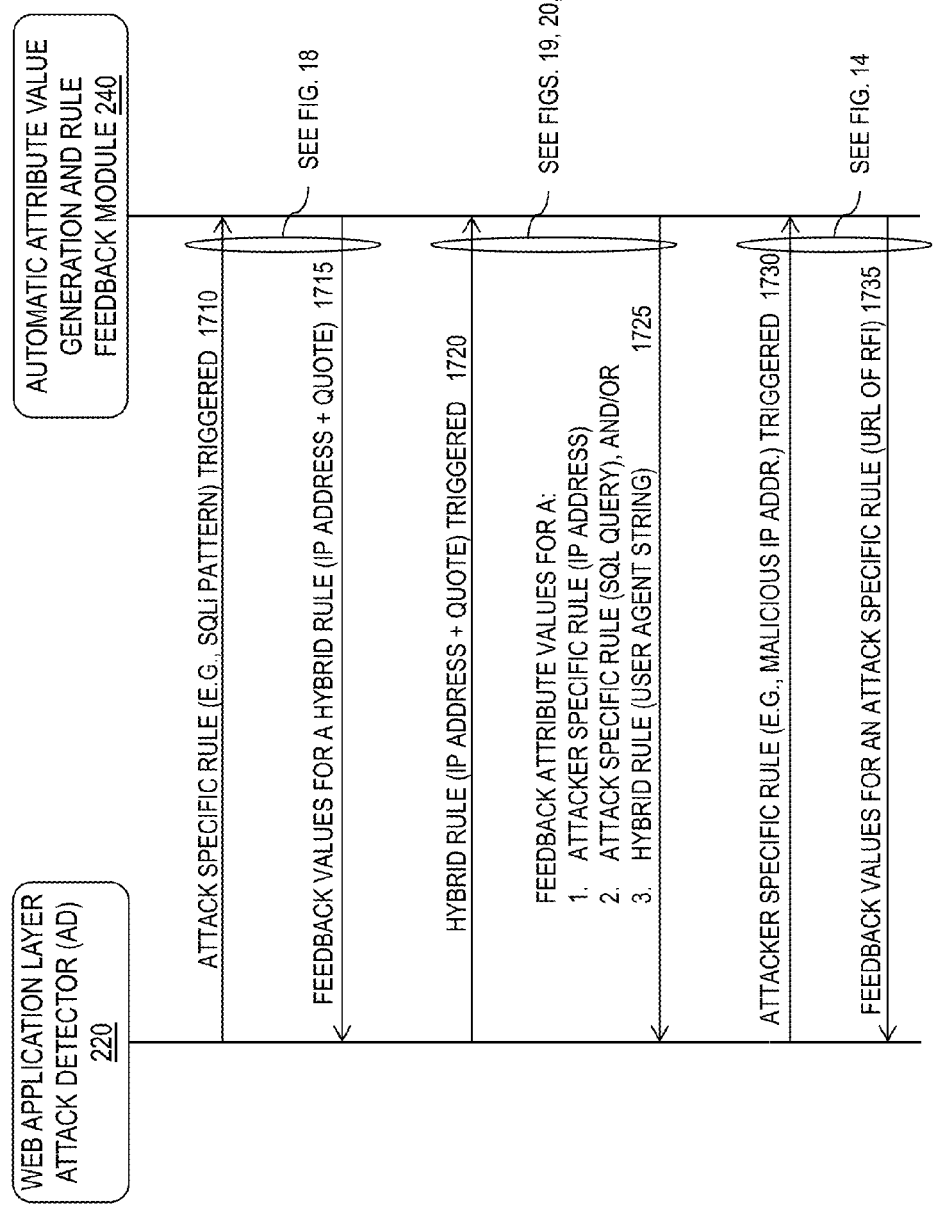
Figure 18:
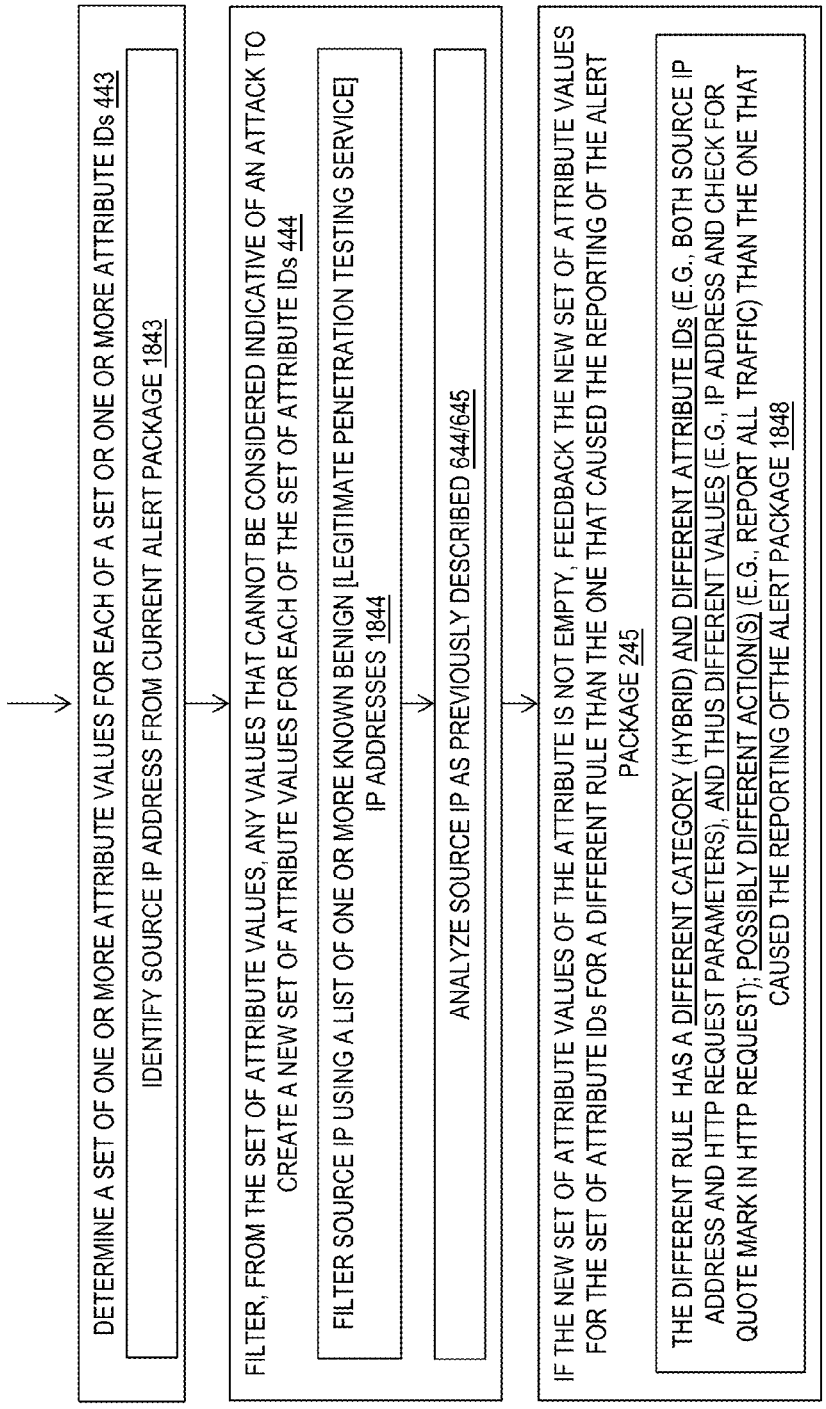
Figure 19:
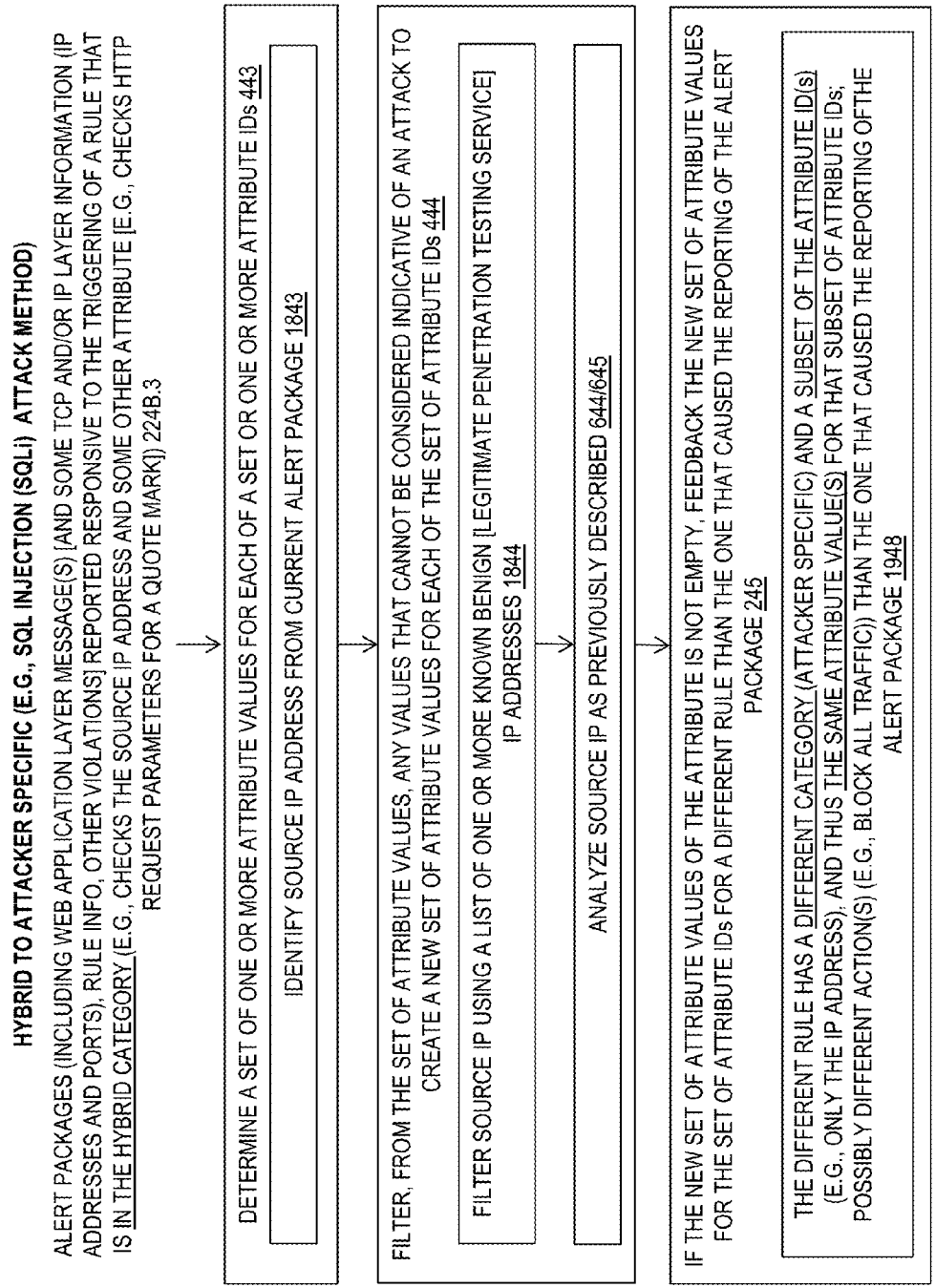
Figure 20:
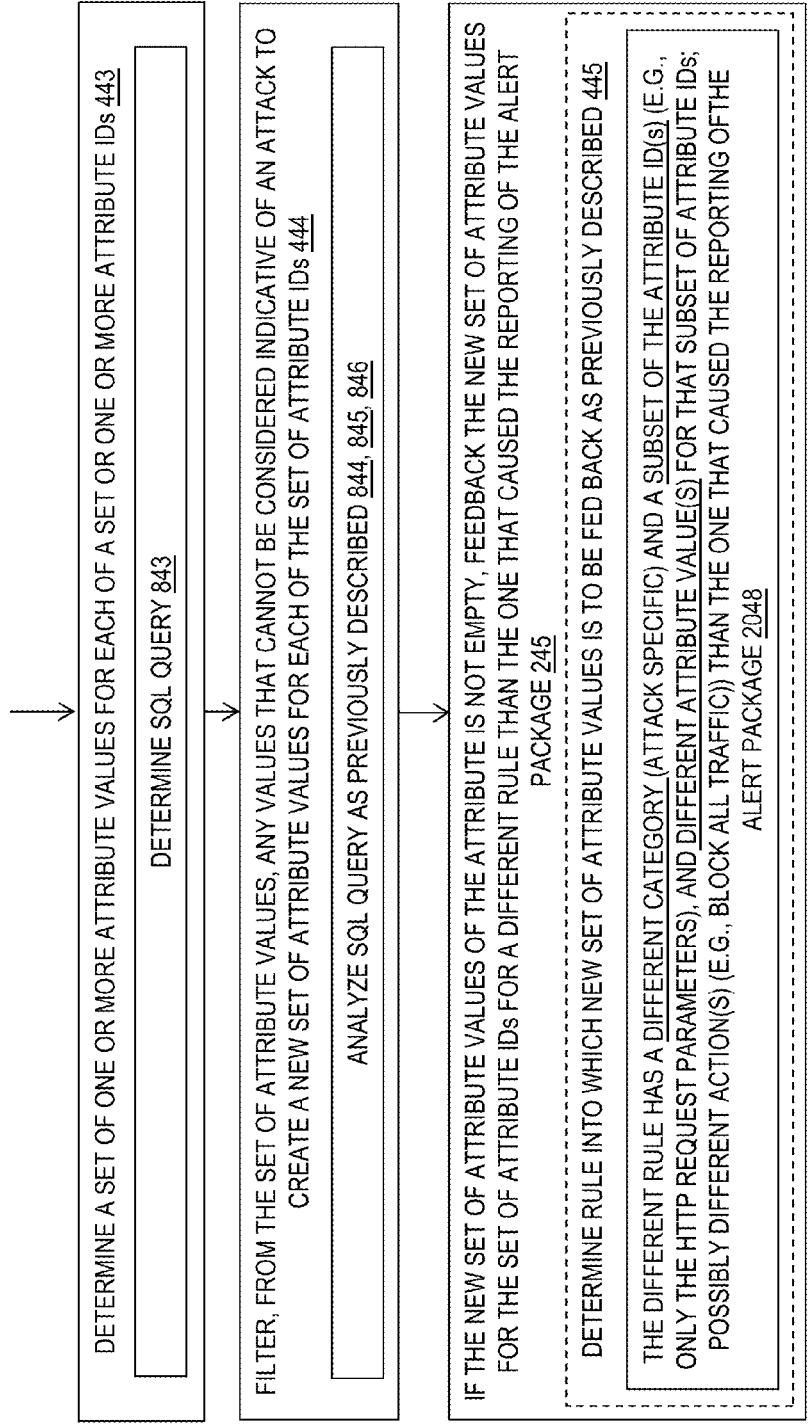
Figure 21:
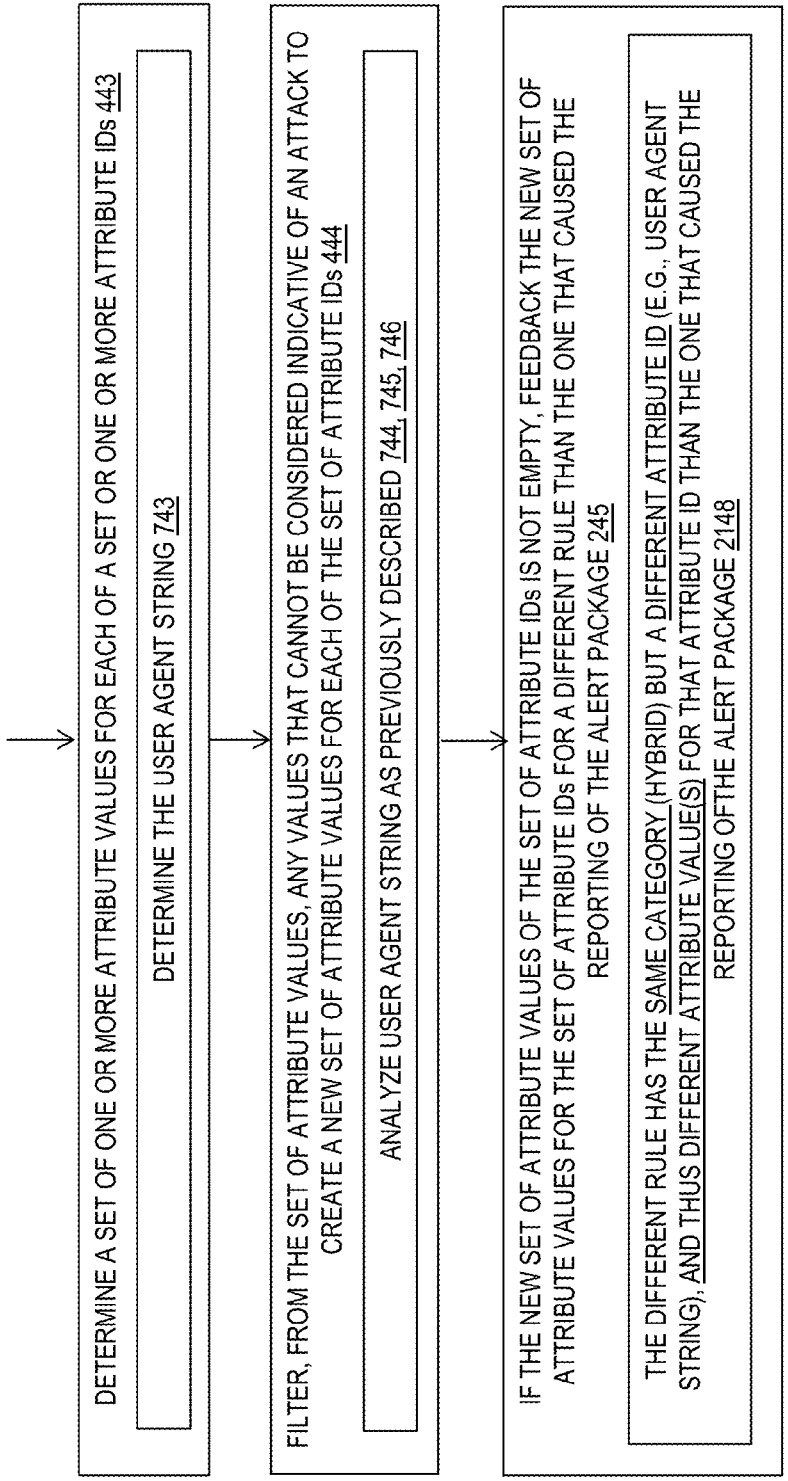
Figure 22:
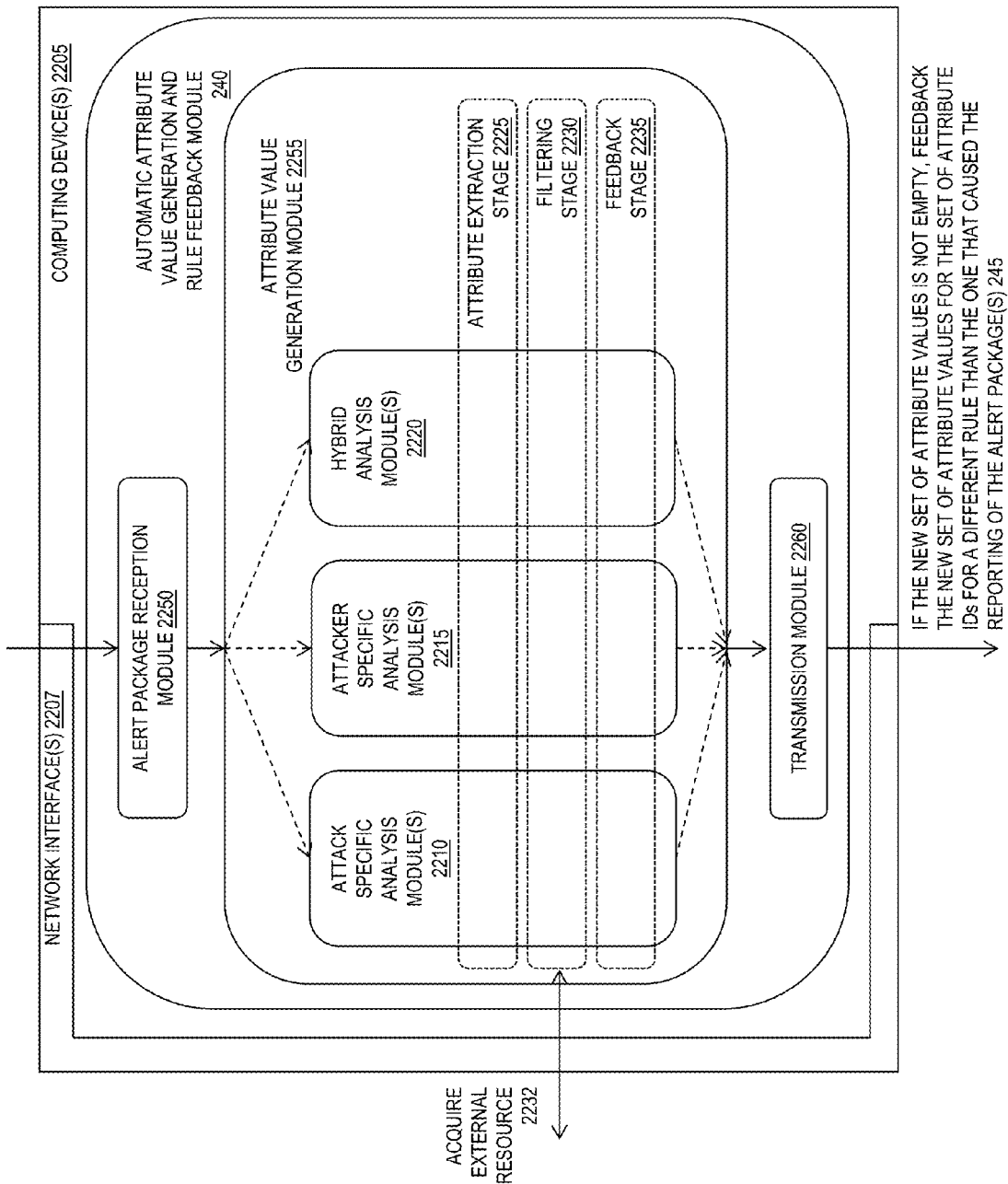
Figure 23:
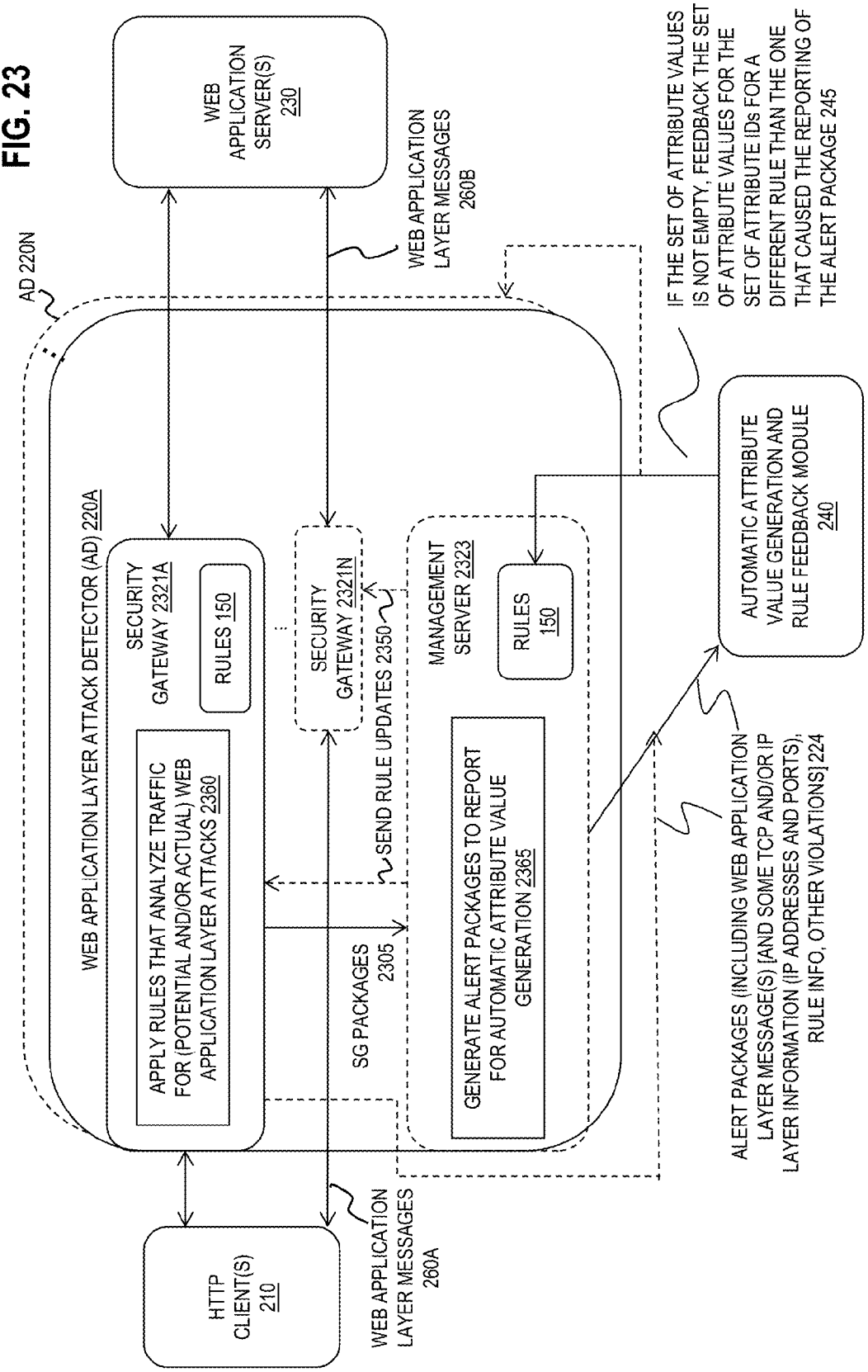
Figure 24:
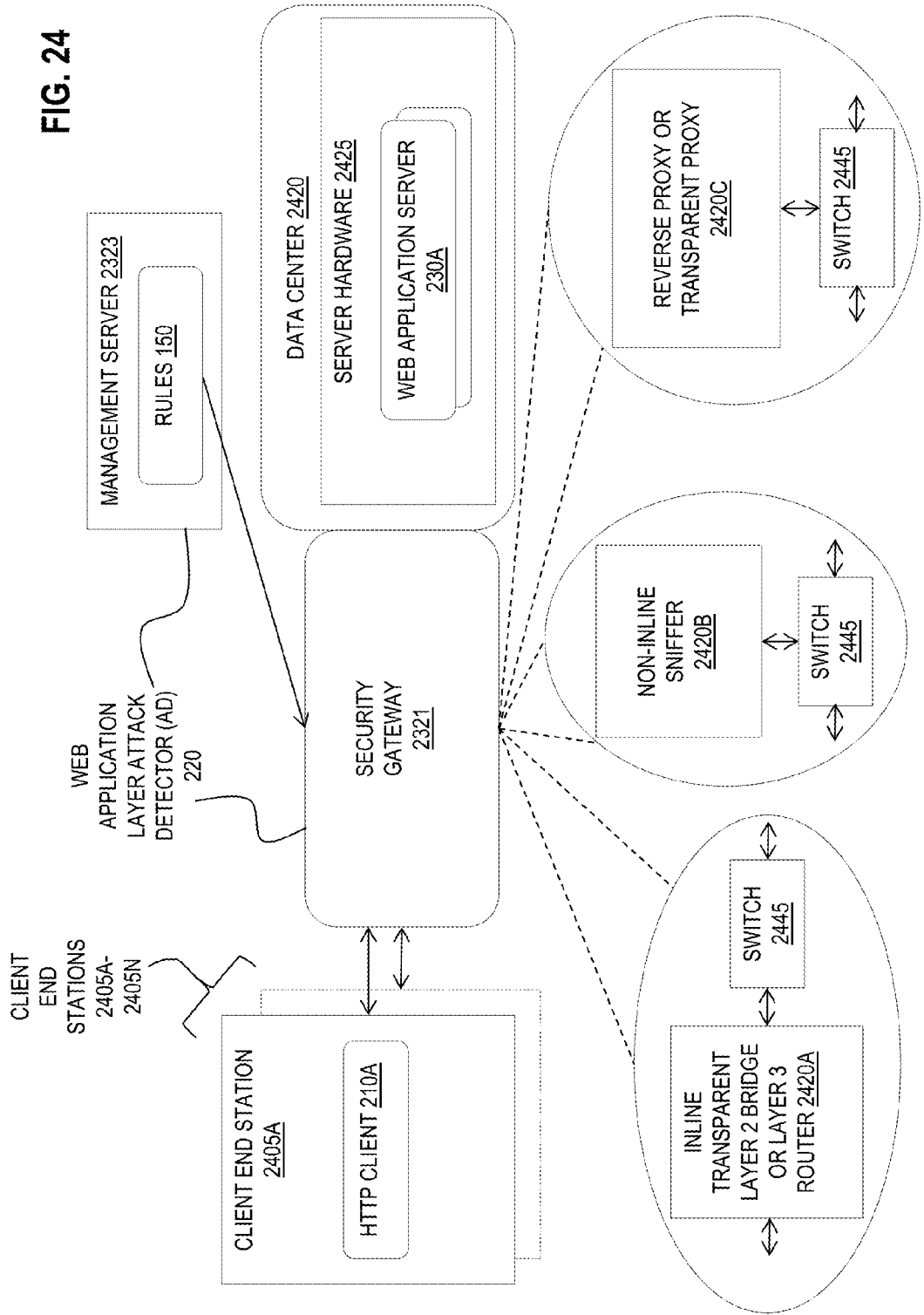

FIG. 1 is a diagram illustrating security rules for detecting attacks of certain attack types existing in the prior art according to certain embodiments of the invention;

FIG. 2 is both a block and a flow diagram illustrating a general technique for automatically generating attribute values of one or more attribute identifiers from packets carrying web application layer request messages according to certain embodiments of the invention;

FIG. 3A is a block diagram illustrating the use of rules to trigger a reporting of an alert package and the resulting new attributes for a different rule according to certain embodiments of the invention;

FIG. 3B is a diagram illustrating security rules of attack specific, attacker specific, and hybrid categories according to certain embodiments of the invention;

FIG. 4 is a flow diagram illustrating a general method for automatically generating and feeding back attribute values of one or more attribute identifiers from packets carrying web application layer request messages according to certain embodiments of the invention;

FIG. 5 is a block diagram illustrating automatic generation of attribute values of one or more attribute identifiers using multiple alert packages from one or a plurality of web application layer attack detectors (ADs) and the feedback of the attribute values to one or more customers according to certain embodiments of the invention;

FIG. 6 is a flow diagram illustrating a technique for utilizing multiple alert packages for automatically generating attribute values of one or more attribute identifiers from packets carrying web application layer request messages using source Internet Protocol (IP) address persistence according to certain embodiments of the invention;

FIG. 7 is a flow diagram illustrating a technique for utilizing multiple alert packages for automatically generating attribute values of one or more attribute identifiers from packets carrying web application layer request messages using User-Agent string repetition according to certain embodiments of the invention;

FIG. 8 is a flow diagram illustrating a technique for utilizing multiple alert packages for automatically generating attribute values of one or more attribute identifiers from packets carrying web application layer request messages to detect SQL injection (SQLi) attacks using query analysis according to certain embodiments of the invention;

FIG. 9 is a block diagram illustrating the performance of multiple types of analysis upon alert packages according to certain embodiments of the invention;

FIG. 10 is a flow diagram illustrating a technique for automatically generating and feeding back attribute values of one or more attribute identifiers from packets carrying web application layer request messages for an attack variant of the same category (and possibly same attack type) as the category (and attack type) detected by a triggered rule according to certain embodiments of the invention;

FIG. 11 is a flow diagram illustrating the techniques of FIG. 4 and FIG. 10 as applied to attacks of the Remote File Inclusion (RFI) attack type according to certain embodiments of the invention;

FIG. 12 is a flow diagram illustrating the techniques of FIG. 4 and FIG. 10 as applied to attacks of the Cross Site Request Forgery (CSRF) attack type according to certain embodiments of the invention;

FIG. 13 is a flow diagram illustrating a technique for automatically generating and feeding back attribute values of one or more attribute identifiers from packets carrying web application layer request messages for an attack of a different category than the category detected by a triggered rule according to certain embodiments of the invention;

FIG. 14 is a flow diagram illustrating the techniques of FIG. 13 as applied to generating and feeding back attribute values of one or more attribute identifiers from packets carrying web application layer request messages for an attack specific rule based upon a triggering of an attacker specific rule (with a specific example related to RFI attacks) according to certain embodiments of the invention;

FIG. 15 is a block diagram illustrating the circular evolutionary path of learning a new attack based upon a triggering of an attacker specific rule to generate a new attack specific rule, and learning a new attacker based upon a triggering of the new attack specific rule to generate a new attacker specific rule, and so on, according to certain embodiments of the invention;

FIG. 16 is a state diagram illustrating possible evolutionary paths for learning different types of security rules according to certain embodiments of the invention;

FIG. 17 is a sequence diagram illustrating a possible evolutionary path including attack specific rules, hybrid rules, and attacker specific rules according to certain embodiments of the invention;

FIG. 18 is a flow diagram illustrating an attack specific rule to hybrid rule evolutionary path (with a specific example related to SQL injection attacks) according to certain embodiments of the invention;

FIG. 19 is a flow diagram illustrating a hybrid rule to attacker specific evolutionary path (with a specific example related to SQL injection attacks) according to certain embodiments of the invention;

FIG. 20 is a flow diagram illustrating a hybrid rule to attack specific evolutionary path (with a specific example related to SQL injection attacks) according to certain embodiments of the invention;

FIG. 21 is a flow diagram illustrating a hybrid rule to hybrid rule evolutionary path (with a specific example related to SQL injection attacks) according to certain embodiments of the invention;

FIG. 22 is a block diagram illustrating modules and stages of an automatic attribute value generation and rule feedback module of a set of one or more computing devices according to certain embodiments of the invention;

FIG. 23 is a block diagram illustrating one or more web application layer attack detectors according to certain embodiments of the invention; and FIG. 24 illustrates exemplary deployment environments of a web application layer attack detector including a security gateway and a management server according to certain embodiments of the invention.

DESCRIPTION OF EMBODIMENTS

In the following description, numerous specific details such as logic implementations, resource partitioning/sharing/duplication implementations, types and interrelationships of system components, and logic partitioning/integration choices are set forth in order to provide a more thorough understanding of the present invention. It will be appreciated, however, by one skilled in the art that the invention may be practiced without such specific details. In other instances, control structures, gate level circuits and full software instruction sequences have not been shown in detail in order not to obscure the invention. Those of ordinary skill in the art, with the included descriptions, will be able to implement appropriate functionality without undue experimentation.

Bracketed text and blocks with dashed borders (e.g., large dashes, small dashes, dot-dash, and dots) are used herein to illustrate optional operations that add additional features to embodiments of the invention. However, such notation should not be taken to mean that these are the only options or optional operations, and/or that blocks with solid borders are not optional in certain embodiments of the invention.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other. Further, although a "Uniform Resource Locator" (URL) is one type of "Uniform Resource Identifier" (URI), these terms are used interchangeably herein to refer to a URI, which is a string of characters used to identify a name or a web resource.

The techniques shown in the figures can be implemented using code and data stored and executed on one or more electronic devices (e.g., an end station, a network device). Such electronic devices, which are also referred to as computing devices, store and communicate (internally and/or with other electronic devices over a network) code and data using computer-readable media, such as non-transitory computer-readable storage media (e.g., magnetic disks; optical disks; random access memory (RAM); read only memory (ROM); flash memory devices; phase-change memory) and transitory computer-readable communication media (e.g., electrical, optical, acoustical or other form of propagated signals, such as carrier waves, infrared signals, digital signals). In addition, such electronic devices include hardware, such as a set of one or more processors coupled to one or more other components, e.g., one or more non-transitory machine-readable storage media to store code and/or data, and a set of one or more wired or wireless network interfaces allowing the electronic device to transmit data to and receive data from other computing devices, typically across one or more networks (e.g., Local Area Networks (LANs), the Internet). The coupling of the set of processors and other components is typically through one or more interconnects within the electronic device, (e.g., busses and possibly bridges). Thus, the non-transitory machine-readable storage media of a given electronic device typically stores code (i.e., instructions) for execution on the set of one or more processors of that electronic device. Of course, one or more parts of an embodiment of the invention may be implemented using different combinations of software, firmware, and/or hardware.

As used herein, a network device (e.g., a router, switch, bridge) is an electronic device that is a piece of networking equipment, including hardware and software, which communicatively interconnects other equipment on the network (e.g., other network devices, end stations). Some network devices are "multiple services network devices" that provide support for multiple networking functions (e.g., routing, bridging, and/or switching), and/or provide support for multiple application services (e.g., data, voice, and video). Client end stations (e.g., server hardware, workstations, laptops, netbooks, palm tops, mobile phones, smartphones, multimedia phones, Voice Over Internet Protocol (VOIP) phones, user equipment (UE), terminals, portable media players, GPS units, gaming systems, set-top boxes) may execute an HTTP client (e.g., a web browser) to access content and/or services provided over a LAN, over the Internet, and/or over virtual private networks (VPNs) overlaid on (e.g., tunneled through) the Internet. The content and/or services are typically provided by one or more end stations (e.g., server end stations comprising server hardware) running a web application server and belonging to a service or content provider or end stations participating in a peer to peer service, and may include, for example, public web pages (e.g., free content, store fronts, search services), private web pages (e.g., username/password accessed web pages providing email services), and/or corporate networks over VPNs.

Exemplary Web Application Layer Attack Types

By way of example, and not by limitation, a few types of web application layer attacks and ways of preventing or mitigating those web attacks are described.

A first type of web application layer attack is commonly referred to as a Remote File Inclusion (RFI) attack. An RFI attack is an attack in which an attacker is able to make a web application server include the contents of one or more remote files within a particular resource, which may then be executed, compiled, interpreted, or sent to another computer device. For example, an attacker may cause the web application server to retrieve and execute code from within a remote file (e.g., "PHP: Hypertext Preprocessor" (PHP) code, Active Server Pages (ASP) code, ASP.NET code, Perl code, etc.). Further, RFI attacks lead to the unauthorized access and/or manipulation of data from the web application server and/or database. RFI attacks are typically enabled through a failure of the web application to validate input variables (e.g., in PHP: $_GET, $_POST, $_COOKIE, $_REQUEST). Thus, by transmitting unanticipated input to the web application server through these input variables (i.e., in HTTP request messages), an attacker may cause a vulnerable web application to execute this unanticipated, non-validated user input. For example, if a PHP application includes an "include ($_GET['template_id'])" statement or a "require $_GET ['template_id']" statement, an attacker may pass a URL of a malicious file as part of an HTTP request message parameter. For example, an HTTP request message including a GET request for "/page.php?template_id=http://www.example.com/attack.txt" will cause the web application to include the contents of the file located at "http://www.example.com/attack.txt"—which may include malicious script (e.g., PHP) code, for example—when interpreting the page.php file to construct a web page for the user. Thus, the contents of the remote file will be executed by the web application server (when creating a web page). One method to prevent RFI attacks is for a web application to validate all inputs before using those inputs, or not allow user input to be directly used with "include" or "require"-type commands. Additionally, a web application can prevent RFI attacks by determining if the parameters of an HTTP request message match a regular expression pattern (e.g., "(ht|f)tps?:VV") that looks for the existence of "http", "https", "ftp", or "ftps", which indicates that the parameters are including a URI of a remote resource.

A second type of web application layer attack is a Cross-Site Request Forgery (CSRF) attack. A CSRF attack is an attack in which an attacker gets another user to unknowingly access a web application to which the user is authenticated. Typically, the attacker is able to cause the victim's web browser to transmit unauthorized commands to the site, which are executed if the site trusts the victim's web browser. For example, an attacker may craft a malicious link, script (e.g., JavaScript), or HTTP element (e.g., an image) that is loaded by a victim's web browser. This malicious entity causes the victim's web browser to transmit an HTTP request message to a website that the victim has previously established a current session with. For example, if the victim's web browser has an unexpired cookie storing authentication information for the website (i.e., is still "logged on"), this malicious HTTP request message may be executed by the website, because it believes that the user is purposefully making the request. Thus, any web application that performs actions based upon input from trusted and authenticated users without requiring that the user authorizes the specific action is at risk. One method to prevent CSRF attacks is for the web application to check the "Referer Header" transmitted by the user's browser to ensure that the referrer page (i.e., the page on which the request was caused to be transmitted) is a known page of the web application, and not an unknown page such as one created or modified by an attacker.

A third type of web application layer attack is the above discussed SQL injection (SQLi) attack. A SQL injection attack is an attack where an attacker includes portions of SQL statements in a web form input element (or directly within a "GET" or "POST" HTTP request message) to a web application in an attempt to get the web application to transmit these portions of SQL statements to a database to be executed. Thus, the attacker may be granted unauthorized access or power to modify data within the database, and may display database schema information (e.g., a list of tables and settings), display data stored in those tables (e.g., contact information, credit card information, and any other type of information), and/or update or delete database data and related data structures or metadata. Further, in some scenarios an attacker may even execute operating system commands through SQLi. One form of SQL injection occurs when user input is directly used by a web application to craft a SQL statement/query but is not validated or "escaped" (e.g., inserting escape characters into a value to prevent it from being executed by a database). For example, a web application may contain the following PHP code creating a SQL command:
$sql="SELECT * FROM users WHERE user_id=$_GET[user_id]";

Assuming the web application does not validate user input data, if an attacker passes the web application a value for 'user_id' that is not a user ID but instead includes carefully crafted SQL code, the SQL code may be executed. For example, an attacker may send a 'user_id' value of:
1; DROP TABLE users;

This will cause the above PHP code to create the following SQL command that selects some arbitrary data from a 'users' table (the record having a user_id value equal to 1) but also deletes (i.e. drops) the 'users' table:
SELECT * FROM users WHERE user_id=1; DROP TABLE users;

Web applications may prevent SQL injection attacks by detecting SQL signatures within user inputs that may be used to generate SQL commands, validating user input (i.e., assuring that a user-supplied input value to be used in a SQL command is of a proper size and/or type), and/or escaping user input (e.g., quotation marks (i.e., apostrophes, single quotes, double quotes, etc.) and other meta-characters) used in generated SQL commands to prevent any SQL code that might be supplied in the user input from being executed.

Exemplary Overview

Attackers continually create attack variants by modifying the carefully crafted malicious HTTP request messages to avoid detection. Thus, attack variants and other "zero-day" attacks are continually crafted and deployed such that current security devices are unable to detect their use until a point when the attacks are ultimately detected and security professionals can manually analyze these attacks to determine their methods and vectors, and then design new security rules to prevent their continued use. However, this attack-detection-analysis-protection cycle leaves a "vulnerability window" wherein applications and networks are vulnerable to the new attacks during the portion of time between the first use of the new attack and the ultimate implementation of protection against the attack.

FIG. 2 is both a block and a flow diagram illustrating a general technique for automatically generating attribute values of one or more attribute identifiers from packets carrying web application layer request messages according to certain embodiments of the invention. In FIG. 2, a web application layer attack detector (AD) 220 is communicatively coupled between a set of one or more HTTP clients 210 and a set of one or more web application servers 230 to protect the web application servers 230 against web application layer attacks from the set of HTTP clients 210. The AD 220 is configured to receive web application layer messages 260A from the HTTP clients 210 that are each carried by one or more packets, apply security rules 150 to the packets, and forward on packets carrying acceptable web application layer messages 260B toward the web application servers 230. In some embodiments, the AD 220 may also be configured to receive packets carrying web application layer messages 260B from the web application servers 230, apply rules 150 to those packets, and transmit those acceptable packets carrying web application layer messages 260A to the HTTP clients 210.

FIG. 2 also depicts an automatic attribute value generation and rule feedback module (AVGRFM) 240 that is communicatively coupled to the AD 220. Although FIG. 2 depicts only one AD 220, some embodiments of the invention utilize a plurality of ADs 220 that protect one or more web application servers, and the plurality of ADs may include ADs owned and/or operated by one business enterprise or by multiple business enterprises, and may be located at one geographic location or multiple disparate geographic locations.

When the AD 220 receives packets carrying web application layer messages 260A-260B, the AD 220 applies the rules 150 by determining whether any of the conditions 108 are satisfied for the packets. When a condition 108 of a rule that analyzes web application layer request messages for potential and/or actual web application layer attacks is met, the AD 220 reports 222 an alert package to the AVGRFM 240. The alert packages 224, depending upon the embodiment of the invention, can include a variety of types of information related to the packets or web application layer messages, including but not limited to part or all the web application layer messages themselves, "packet parts" that include information from packet headers of the packet(s) carrying the web application layer messages that meet the rule condition (e.g., source or destination IP addresses from an IP header, source or destination ports from a TCP header or UDP header, a Media Access Control (MAC) address or Virtual LAN (VLAN) identifier value from an Ethernet header, etc.), an identifier 100 of the matched rule having the condition 108 met, part or all of the condition 108 of the matched rule, an attack type 130 of the matched rule, a category 320 of the matched rule, a set of violation indicators describing other flaws or departures from proper protocol found in the packets, and/or a timestamp generated by the AD 220 indicating when the AD 220 received or processed the packet(s).

The AVGRFM 240, in embodiments of the invention, receives the alert package(s) 224 from the AD 220 (and perhaps other alert packages 224 from the same AD 220 or other ADs), over a wired or wireless network interface. In alternate embodiments, though, the AVGRFM 240 may be a module executing on a same computing device as part of the AD 220 itself (e.g., the management server 2323), and thus the alert packages 224 may be transferred between the AVGRFM 240 and the AD 220 using a bus, shared memory space, etc.

In the depicted embodiment of FIG. 2, the AVGRFM 240 operates on a "batch" of alert packages that includes one or more alert packages 224 to attempt to automatically generate 241 a new set of one or more attribute values 104 for each of a set of one or more attribute identifiers 102. To accomplish this task, the AVGRFM 240, in the depicted embodiment, analyzes 243 the web application layer content and/or the source IP addresses of the batch of web application layer messages, as well as possibly other alert packages—such as those including a same source IP address, and/or other alert packages reported due to a triggering of a same rule, for example. If the new set of attribute values is not empty—that is, the AVGRFM 240 was able to successfully automatically generate a new set of attribute values for each of a set of attribute identifiers—the AVGRFM 240 will feed back 245 the new set of attribute values to the AD 220 (and possibly other ADs) for a different rule than the initially triggered rule (having the condition that was met) that caused the reporting of the alert package. The different rule may differ from the initially triggered rule in a variety of ways, including pertaining to a different attack type 130, utilizing different actions 106, utilizing different attribute identifiers 102, and/or utilizing different attribute values 104 than the initially triggered rule; and in some embodiments described later herein, the different rule may be of a different category 320 than the initially triggered rule. Accordingly, this automatic generation 241, by the AVGRFM 240, of the new set of attribute values 104 can enable the AD 220 to use a different rule to specifically defend against unknown web application layer attacks, without any human intervention, and without a large vulnerability window that would allow the attack to continue to affect the set of web application servers 230. Similarly, in certain embodiments described later herein, this automatic generation 241 can enable the AD 220 to use a different rule that is attacker specific to further analyze web application layer request messages of an attacker to ultimately learn new sets of attribute values 104 that identify additional unknown web application layer attacks for other attack specific rules.

Thus, the attribute values are automatically extracted from monitored web application layer request messages destined to one or more web applications by one or more web application layer attack detectors (ADs). These automatically generated attribute values may be fed back to some or all of the set of ADs protecting the one or more web applications, and further may be automatically provided to other, non-related ADs to protect other web applications from web application level attacks. Additionally, the automatically generated new set of attribute values may be transmitted to other computing devices of other organizations for further use outside of the immediate community of ADs. For example, when the attribute values identify a source of web attacks (i.e., are attacker-specific attribute values), this source information can be transmitted to computing devices of search engines and/or security services that rank or identify the potential threat posed by specific hosts. Further, the attribute values may be used to notify Internet Service Providers (ISPs) that provide network services to the attackers about the malicious activity, or used to notify the owners or operators of individual end stations that their devices may be compromised and are being used to perform web application attacks.

In some embodiments, the AVGRFM analyzes web application layer request messages reported by one or more ADs as alert packages, determines new attribute values of one or more attribute identifiers for rules that detect suspicious web application layer request messages, and feeds those attribute values for rules back to the ADs to enable those ADs to detect new variants of web application layer attacks. Thus, the one or more ADs detect web attacks against web applications by continuously monitoring web application layer request messages directed at those web applications, identifying web application layer request messages that are suspected as malicious, and outputting the HTTP request messages that are potentially part of an attack as alert packages.

Accordingly, embodiments of the invention are particularly effective due to the nature of the ADs as protecting real web applications and not simulated servers, such as honey pots, which often are not the target of sophisticated attacks. Accordingly, the attack information observed by the ADs is particularly legitimate and useful as it represents actual attacks occurring against actual web application servers from real HTTP clients.

FIG. 3A is a block diagram illustrating the use of rules 150 to trigger a reporting of an alert package and the resulting new attributes for a different rule according to certain embodiments of the invention. In FIG. 3A, the set of rules 150 are applied to a set of one or more packets carrying a web application layer message. In this example, the condition of a third rule 314 is met, as the attribute values 104 (here represented by 'Y3' 324) of the attribute identifiers 102 ('X3' 334) for the third rule 314 are satisfied by the set of packets. Accordingly, an alert package 224 is generated and sent 350 to the AVGRFM 240 for processing. After automatically generating 241 a new set of one or more attribute values 104 for each of a set of one or more attribute identifiers 102, the new set of attribute values for a set of attribute identifiers are fed back 370 for a different rule 310 than the rule 314 having its condition satisfied by the set of packets. In the depiction of FIG. 3A, the new set of attribute values ('Y1' 320) are different than the set of attribute values ('Y3' 324) of the triggering rule, and the set of attribute identifiers ('X1' 330) for the different rule 310 are also different than the set of attribute identifiers ('X3' 334) of the triggered rule 314. However, in different scenarios the different rule 310 may utilize the same set of attribute identifiers (e.g., 'X3' 334) as the triggered rule 314, and/or utilize different detection logic 101 than that of the triggered rule 314, and/or utilize a different set of actions 106 than those of the triggered rule 314.

FIG. 3B is a diagram illustrating security rules of attack specific, attacker specific, and hybrid categories according to certain embodiments of the invention. While the structure of rules 150 of FIG. 3B may be similar or the same as that of the rules 150 in FIG. 1, embodiments of the invention utilize a different conceptual categorization scheme where each rule may belong to a particular category 320 of rule. For example, a first rule 110 may be an attack specific 322 rule, and thus be designed to detect particular types 130 of attacks. Alternatively, a second rule 112 may be an attacker specific 324 rule and thus be designed to detect packets transmitted by, destined to, or otherwise associated with a particular end user, HTTP client, or IP address. For example, an attacker specific rule 324 may utilize a condition 108 with an attribute ID 102 of "source IP address" and the respective attribute value(s) 104 may include a set of one or more IP address values. Further, a third rule 114 may be a hybrid 326 category rule, which is a rule that is not only attack specific 322 and is not only attacker specific 324. Thus, some hybrid rules may contain both attack specific 322 and attacker specific 324 aspects. For example, a hybrid rule may include a condition 108 looking for both an attacker specific value (e.g., a source IP address) as well as an attack specific value (e.g., a quotation mark within a HTTP request parameter). This type of hybrid rule enables the system to be more sensitive to certain web application layer request message patterns—and thus learn new attacks that are well concealed—when a particular HTTP client is known to have a bad reputation. Additionally, some hybrid rules may contain aspects that are not clearly attack specific 322 or attacker specific 324. For example, a hybrid rule may include a condition 108 looking for a particular User-Agent string value, which may indicate information about what software the end user is utilizing, but does not indicate anything specific to a particular end user or a particular attack.

FIG. 4 is a flow diagram illustrating a general method for automatically generating and feeding back attribute values of one or more attribute identifiers from packets carrying web application layer request messages according to certain embodiments of the invention. In the embodiment depicted by FIG. 4, the attempt to automatically generate a new set of one or more attribute values for each of a set of one or more attribute identifiers 241 includes two phases. First, a set of one or more attribute values for each of a set of one or more attribute identifiers is determined 443 using one or more received alert packages 224. In some embodiments, the determination 443 occurs using a configured set of attribute identifiers 102, from which the attribute values 104 of those attribute identifiers 102 are determined. For example, in various embodiments, the determination 443 may include identifying one or more values from the web application layer message and/or "packet parts" included in the alert packages, such as identifying a source and/or destination IP address (e.g., from an IP header of the packet(s) carrying the web application layer message), values of HTTP headers (e.g., identifying the value of a Referer header and/or User-Agent header from the web application layer message), or values of HTTP parameters (e.g., query string attribute names and attribute values, parameters sent in "POST" method HTTP messages within the HTTP message body). In some embodiments, the determination 443 occurs by generating the set of attribute values that may comprise attack traffic shape attribute values and other metadata such as a count of HTTP request messages observed over a particular time period, a frequency of observed HTTP request messages, or an inter-message delay of observed HTTP request messages. For example, in an embodiment the set of attributes includes a value representing a number of packets received from a particular source IP address over a period of time, and in an embodiment the set of attributes includes a generated value representing the size (e.g., in bytes) of the web application layer message. The values of these attributes may be extracted from packets carrying HTTP request messages, specific HTTP request messages or sequences of HTTP request messages, and/or calculated based upon a sequence of packets and/or HTTP request messages.

As an example, in an embodiment the AVGRFM 240 determines 443 the set of attribute values by categorizing the processed HTTP request messages according to the type of attack they are part of, which may be indicated within the alert package by an identifier of the particular rule or rules that were triggered by the HTTP request messages. Then, the AVGRFM 240 may extract attribute values of one or more attribute identifiers from the malicious web application layer request messages that serve as unique identifiers of the messages.

In some embodiments of the invention, the automatic generation 241 of a new set of attribute values occurs a plurality of times in the AVGRFM 240 for a particular alert package, either serially or in parallel, by a plurality of modules configured to determine different sets of attribute values for sets of attribute identifiers 102. In these embodiments, the sets of attribute values from the plurality of modules may be used separately to generate new sets of attribute values for different rules. In some embodiments, the sets of attribute values from the plurality of modules are used in combination to generate multiple attribute identifier/attribute value pairings for one particular different rule.

After determining 443 a set of attribute values for each of a set of attribute identifiers, the automatic generation 241 enters a second phase of filtering 444, from the determined set of attribute values, any values that cannot be considered indicative of an attack to create the new set of attribute values for each of the set of attribute identifiers. The filtering phase 444 can be based upon a variety of different factors, including filtering based upon characteristics of the current alert package (e.g., a length of a SQL query portion attribute value from an HTML request message parameter), performing a test (e.g., checking if a resource identified by a URL attribute value from an HTML request message parameter includes a malicious script pattern), performing one or more comparisons (e.g., determining if an IP address attribute value from an IP header included in the alert package exists within a "whitelist" of known benign IP addresses or IP address ranges), or performing an analysis based upon properties of other alert packages (e.g., determining if any other alert packages, perhaps from other ADs, include the same attribute values).

After the attempt to automatically generate 241 the new set of attribute values for each of the set of attribute identifiers, if the new set of attribute values is not empty, the new set of attribute values for each of the set of attribute identifiers is fed back for a different rule than the one that caused the reporting of the alert package (i.e., the "triggering rule"). In the depicted embodiment of FIG. 4, this may include determining 445 the rule into which the new set of attribute values is to be fed back to. This different rule may already exist at the time the triggering rule had its condition met, or the different rule may be created "on the fly" when the new set of attribute values for each of the set of attribute identifiers are fed back. In the case when the different rule already exists, the rule may be determined based upon the particular attribute identifiers of the new set of attribute values. For example, if one of the attribute identifiers is a source IP address, a particular attacker specific 324 rule may be determined to be the different rule that the set of attribute values is to be included in. In some embodiments, the rule is determined 445 based upon characteristics of the set of attribute values, and different characteristics of the attribute values may, for example, determine whether the new set of attribute values is to be fed back to a more or less restrictive rule. By way of example, if each of a set of attribute values is a SQL query portion, a characteristic may be a length of the query portion. In an embodiment, a SQL query portion that is shorter than a particular threshold value will be fed back for a less restrictive rule (i.e., more permissive), and/or a SQL query portion that is longer than a particular threshold value may be fed back for a more restrictive rule. Upon determining 445 the rule, the new set of attribute values may be transmitted to one or more ADs along with an indicator of which rule those attribute values are for. Alternatively, the new set of attribute values may be transmitted along with commands and/or data indicating an instruction to construct a new rule.

FIG. 5 is a block diagram illustrating automatic generation of attribute values of one or more attribute identifiers using multiple alert packages from one or a plurality of web application layer attack detectors (ADs) and the feeding back of the attribute values according to certain embodiments of the invention. In FIG. 5, the AVGRFM 240 is coupled to a first AD 220A of a first customer 505 (e.g., business enterprise), as well as optionally coupled to a second AD 220B of a second customer 510 and a plurality of ADs 220C-220N of a third customer 515. In certain embodiments, each customer (e.g., 505, 510, and 515) is located at a different geographic location, and in some embodiments one customer (e.g., 515) may have an AD (e.g., 220C) at one geographic location and another AD (e.g., 220N) at a second geographic location.

The AVGRFM 240, in certain embodiments, utilizes multiple alert packages 224 when attempting to automatically generate 241 the new sets of attribute values 104 for each of a set of attribute identifiers 102. Accordingly, during the analysis 243 of web application layer message content and possibly the lower-level (i.e., non-web application layer) packet information included within an alert package, the AVGRFM 240 may further utilize information from other alert packages or information describing other alert packages. For example, the analysis may also include examining other alert packages (from a same AD or different ADs) sharing a particular set of attribute values (e.g., sharing a common source IP address, sharing common HTML request parameters) or being reported due to a triggering of the same rule.

In performing the analysis 243, the AVGRFM 240 may perform the determining 443 and filtering 444 phases depicted in FIG. 4. As an example, in an embodiment the determining 443 of the new set of attribute values phase may include only those values that appear in multiple alert packages, either from one AD, from multiple ADs, or either. As another example, the filtering 444 phase may utilize information to remove determined values from the new set of attribute values if those values have not appeared in multiple alert packages (i.e., a possible attack has not been attempted repeatedly), or if those values have not appeared in web application layer messages from a threshold number of different IP addresses (i.e., a possible attack has not been used by multiple attackers, which often occurs when an attack is included in an automated attack tool). Further detail illustrating several different ways of using community information to perform the determining 443 and filtering 444 phases of FIG. 4 are now provided with regard to FIGS. 6-8.

In FIG. 5, each of the ADs 220A-220N are communicatively coupled to the AVGRFM 240 and thus are able to both report alert packages 224 to the AVGRFM 240 as well as receive automatically generated new sets of attribute values 104 for use in rules different than those leading to the alert packages 224 being generated and sent. In an embodiment of the invention, the AVGRFM 240 will send the automatically generated new sets of attribute values 104 for each of a set of attribute identifiers 102 to an optional distribution module 550, which then transmits the new sets of attribute values 104 to the ADs 220A-220N. In some embodiments, the distribution module 550 is part of or executing on a separate computing device than the AVGRFM 240. However, in some embodiments a distribution module 550 does not exist and instead all distribution is performed by the AVGRFM 240.

In embodiments of the invention utilizing multiple ADs, a security intelligence sharing community may be formed from participants utilizing aspects of the invention. According to an embodiment of the invention, malicious HTTP request messages identified by multiple ADs are collected from all or some of the community's members, correlated and analyzed together to identify attribute values describing a new attack, attacker, and/or suspicious behavior, which may then be reported back to the ADs of the community members. In this manner, activity that is merely suspicious from the standpoint of an individual AD or community member can be positively identified as an attack when this same suspicious activity is identified as being detected by multiple ADs in the community. Moreover, attribute values of a new attack initially observed at one AD may be identified and shared with other ADs within a short period of time to prevent the attack from being further utilized. In this manner, the generated attribute values are automatically acquired from real-world attacks and may quickly be determined and disseminated to the community of ADs, such that a new, unpublished, and/or modified attack can be identified and the community can be rapidly "immunized" against the attack, thereby reducing the vulnerability window of all in the community.

FIG. 6 is a flow diagram illustrating a technique for utilizing multiple alert packages for automatically generating attribute values of one or more attribute identifiers from packets carrying web application layer request messages using source Internet Protocol (IP) address persistence according to certain embodiments of the invention. In this depiction, the set of one or more attribute values for each of a set of one or more attribute identifiers is determined 443 by analyzing "packet parts" from one or more received alert packages to determine 643 the source IP addresses from each respective set of packets. The set of attribute values—the observed source IP addresses—is filtered 444 to remove those source IP addresses that cannot be considered indicative of an attack to create the new set of attribute values (source IP address values) for each of a set of attribute identifiers (source IP address field from an IP header). This filtering 444 includes updating a tracking list maintained to contain: 1) the source IP addresses in alert packages recently reported responsive to the triggering rule, 2) a report count indicating the number of times each source IP address in the list has been recently reported, and/or 3) a target count indicating a number of different destination IP addresses (i.e., target web application servers) were recently sought by that source IP address. For the purposes of this table, the determination of whether something is deemed "recent" depends upon the embodiment and configuration—it can be defined as a period of time (e.g., alert packages from the last week, day, hour, or number of minutes are deemed recent) and/or a number of alert packages (e.g., only the last 5000, 1000, 500, 100, or 50 alert packages are deemed recent, or a number of alert packages in a sliding window of the previous received alert packages); or simply the number of alert packages in a current batch of processing are those deemed recent. This table, in an embodiment, is used to filter 645 the set of attribute values by keeping those values that have a report count value from the table that meets or exceeds a first configured threshold and have a target count value from the table that meets or exceeds a second configured threshold, which indicates that the source IP address is making frequent attempts to send web application layer request messages to a multitude of different web application servers. Depending upon configuration, the first and second configuration thresholds can be the same or different, according to the degree of sensitivity the system should have in each implementation (i.e., based upon the need to block all attacks in view of the possible adverse effects of improperly blocking web application layer request messages that might not be an attack).

FIG. 7 is a flow diagram illustrating a technique for utilizing multiple alert packages for automatically generating attribute values of one or more attribute identifiers from packets carrying web application layer request messages using User-Agent string repetition according to certain embodiments of the invention. As described above, User-Agent strings are values included within the headers of HTTP request messages that identify the software requesting a web page/response from a web application server. However, often attackers will not include a User-Agent string, or will use a User-Agent string that is known to be typically used by a malicious hacking tool.

In the embodiment of FIG. 7, the determination 443 phase includes determining the User-Agent string from each of a set of web application layer messages to generate a set of attribute values. The depicted filtering phase 444 includes three sub-blocks. The first, block 744, includes updating a table maintained to include 1) the different User-Agent strings in recently reported alert packages, 2) a report count indicating how many times each User-Agent string was reported in the recently reported alert packages, and 3) a source count indicating how many different source IP addresses were included in the sets of packets carrying web application layer messages using each User-Agent string. Similar to FIG. 6, the determination of what is "recently reported" is left to configuration. Using this table, the filtering 444 phase includes keeping 745 in the set of attribute values those User-Agent strings having a report count that meets or exceeds a first threshold and a source count that meets or exceeds a second threshold, wherein the first and second thresholds may be the same or different, depending upon configuration. FIG. 7 also includes an additional filtering 444 block 746, where those User-Agent strings existing in a list of commonly used or known legitimate User-Agent strings are removed. This list of commonly used or known legitimate User-Agent strings may be populated by the AVGRFM 240 based upon experience and observation, statically configured by an administrator, or periodically updated by requesting an updated list from a computing device with access to such a list (e.g., such as a maintained list of common User-Agent strings that can be found on the Internet). Thus, the attribute values will only include those User-Agent strings recently used a number of times by different source IP addresses and that are not known to be legitimate.

FIG. 8 is a flow diagram illustrating a technique for utilizing multiple alert packages for automatically generating attribute values of one or more attribute identifiers from packets carrying web application layer request messages to detect SQL injection (SQLi) attacks using query analysis according to certain embodiments of the invention.

In FIG. 8, the determining 443 phase includes determining the SQL queries that exist in the web application layer messages of the alert packages in HTML request message parameters (e.g., query string values) to generate the set of attribute values. In an embodiment, each SQL query is normalized by enforcing a common spacing scheme (e.g., 1 space) between SQL query elements and a common encoding, though this is not strictly necessary for the operation of the system.

The filtering 444 phase of FIG. 8 includes a block 844 where a set of patterns are determined from the SQL queries. In various embodiments, the patterns are determined using a set of regular expressions that generically detect certain elements and/or combinations of elements used in SQL injection attacks, including but not limited to reserved SQL keywords, SQL meta-characters, and other commonly-used characters in SQL queries. For example, the set of regular expressions might flexibly look for the existence of an equals sign ("=") or its hex equivalent encoding ("%3D") in a SQL query. Another of the set of regular expressions might look for the existence of a single quote or its hex equivalent encoding ("%27"), a repeated dash mark (also referred to as a "double-dash"), or a semi-colon or its hex equivalent encoding ("%3B"). Another of the set of regular expressions might look for the existence of one or more reserved SQL keywords, such as "SELECT", "UNION", "DELETE FROM", or "UPDATE", though this list is not exhaustive and many other additional SQL keywords are well known to those of skill in the art. Others of the set of regular expressions might look for the existence of the letters "sp" or "xp" in a SQL query, which are often used when executing stored procedures using some databases, and may also look for one or more alphanumeric and/or underscore characters following the "sp" or "xp" that define the name of a particular stored procedure.

With the set of determined SQL patterns, the filtering 444 phase of FIG. 8 also includes a block 845 where those SQL patterns having a length less than a threshold are removed, as it is difficult to determine unique attack patterns from shorter SQL queries. In an embodiment, the threshold is 10 characters, although many other thresholds are possible and useful.

With the length-filtered set of SQL patterns, the filtering 444 phase of FIG. 8 also includes block 847 in which the new set of attribute values are made to include only those of the SQL patterns that exist in at least a threshold number of web application layer messages from recently reported alert packages describing packets that are from at least another threshold number of different source IP addresses. Depending upon configuration, both of these thresholds may be the same or different. In an embodiment, this block 846 may be performed in part by maintaining and relying upon a table including: 1) the determined 844 SQL patterns, 2) a report count indicating how many times each SQL pattern has appeared in recently reported web application layer messages, and 3) a source count indicating how many different source IP addresses were included in the recently reported sets of packets carrying web application layer messages including each SQL pattern. Similar to the embodiments of FIG. 6 and FIG. 7, the determination of what is "recently reported" is left to configuration. Thus, the new set of attribute values will include those SQL patterns recently used a number of times by different source IP addresses.

Next, in block 245, if the new set of attribute values is non-empty, the new set of attribute values for each of a set of attribute identifiers is fed back to one or more ADs for a different rule than the rule (or any of the rules) that caused the reporting of the respective alert package(s). In an embodiment, this block 245 includes determining 445 a rule into which the new set of attribute values is to be fed back to. As illustrated in FIG. 8, the determining 445 may include an analysis of the length of the SQL query patterns serving as the new set of attribute values. In an embodiment 847, if the length of a particular SQL query pattern is within a first range of lengths, then that SQL query pattern is fed back for a less restrictive rule having a set of actions that causes the set of ADs to report—but not block—web application layer request messages including that SQL query pattern. Similarly in block 847, if the length of a particular SQL query pattern is greater than the largest length of the first range of lengths, then the SQL query pattern is fed back as an attribute value for a more restrictive rule including an action that both reports alert packages and blocks the web application layer request messages, under the premise that longer SQL patterns are more likely to be attacks than shorter SQL patterns. Thus, in various embodiments, the characteristics of the data within the web application layer messages (and/or other information from the packets carrying the web application layer messages) are analyzed to determine the rule that the automatically generated set of attribute values are fed back for. Alternative embodiments may instead use different analysis modules that filter on length of the SQL patterns and respectively provide attribute values to the more and less restrictive rules.

FIG. 9 is a block diagram illustrating the performance of multiple types of analysis upon alert packages according to certain embodiments of the invention. FIG. 9 depicts one configuration of an AVGRFM 240 including one or more different analysis modules 910A-910Q, each performing a different type of analysis using the alert packages. Each analysis module 910A-910Q may perform the automatic generation 241 and feedback 245 steps illustrated at least in FIGS. 2, 4, 6-8, 10-14, and 18-21.

In this depicted embodiment, the AVGRFM 240, upon receiving a set of one or more alert packages 224 from one or more ADs 220, selects 905 a set of alert packages to be analyzed using each analysis module based upon rule information present in the alert packages. For example, in an embodiment, each alert package includes a rule identifier indicating which of the rules 150 had its condition met by the packet(s) carrying the web application layer message included in the alert package. In one embodiment, the AVGRFM 240 is configured to determine, for each of the one or more rule identifiers 100 in an alert package, which of the analysis modules 910A-910Q should analyze that alert package. For example, the AVGRFM 240 may maintain a data structure designating that a rule identifier (e.g., '10') from an alert package indicates that the alert package should be analyzed by certain analysis modules (e.g., a first analysis module 910A and a third analysis module 910C). In other embodiments, other information from each alert package is used for the purpose of selecting 905 which analysis should be performed. For purposes of illustration and not limitation, this other information may include a rule category 320 indicator, an action 106 (e.g., describing that any packets meeting the condition of that rule are to be processed using a particular set of analysis modules 910A-910Q), any of the set of one or more attribute identifiers 102, an IP address or port identified in the set of packets carrying the web application layer message, a timestamp included in the alert package identifying a time the respective packets arrived or when the alert package was generated or transmitted. Alternatively, each analysis module 910A-910Q may be configured to process alert packages that triggered particular rules—e.g., a first analysis module 910A may be configured to process those alert packages that triggered rules 1, 4, 7, and 19, for example.

FIG. 10 is a flow diagram illustrating a technique for automatically generating and feeding back attribute values of one or more attribute identifiers from packets carrying web application layer request messages for an attack variant of the same category (and possibly same attack type) as the category (and attack type) detected by a triggered rule according to certain embodiments of the invention. Initially, a set of alert packages 224A (including web application layer messages and optionally information from the packet(s) carrying the web application layer messages such as the "packet parts", triggered rule information and/or identifiers, other information from or describing other packets triggering rules, etc.) is reported responsive to a triggering (i.e., a condition being met) of a rule that is in a particular category 320 and that is for detecting a particular attack type 130. For example, the triggering rule could be in an attack specific 322 category rule that detects an RFI attack type 130. After attempting to automatically generate 241 a new set of one or more attribute values 104 for each of a set of one or more attribute identifiers 102, the set of attribute values 104 for each of the set of attribute identifiers 102 is fed back 245 for a different rule than the one that caused the reporting of the alert package. In this depicted example where attribute values 104 are automatically learned for an attack variant of the same category, the different rule has 1048 different actions 106, attribute identifiers 102, and/or attribute values 104 than the triggered rule, but the same category (e.g., attack specific 322) and attack type (e.g., RFI attack type 130) as the triggered rule.

FIG. 11 is a flow diagram illustrating the techniques of FIG. 4 and FIG. 10 as applied to attacks of the Remote File Inclusion (RFI) attack type according to certain embodiments of the invention.

As illustrated in FIG. 11, an alert package is reported 224A.1 responsive to the triggering of a rule that is in the attack specific category 322 and that is for detecting RFI attacks. As an example, assume an attacker's HTTP client transmits one or more HTTP request messages including a remote resource location (i.e., URL) identifying a resource containing malicious code that the HTTP client attempts to get a web application server to "include" and execute. An AD, which is coupled between the attacker's HTTP client and the destination web application server, receives the set of packets carrying the HTTP request message that includes the remote resource location. Upon analyzing the HTTP request message by applying a set of security rules, the AD determines that the HTTP request message might constitute an RFI attack, and might block the HTTP request messages. This determination may occur, for example, by a first rule that matches a regular expression pattern (e.g., "(ht|f)tps?:\/\/") against known specific parameters of those HTTP request messages for known vulnerable URLs, such as looking for the existence of "http", "https", "ftp", or "ftps", which indicates a remote file location, in one of the specific parameters for those HTTP request messages performing a GET or POST for a URL known to be vulnerable. Of course, many other patterns and/or regular expressions to detect RFI attacks are known to those of skill in the art. After making the determination that the HTTP request message might constitute an RFI attack based upon the existence of the pattern within the known specific parameters, the AD transmits the HTTP request message, as part of an alert package 224A.1, to the AVGRFM 240 for further analysis. In some embodiments, the alert package will include a rule identifier to identify the triggered rule(s) (here, an identifier of the first rule), values used in the first rule, and/or an indicator of a potential attack type (e.g., RFI) of the HTTP request message based upon what type of attack the first rule is designed to detect.

The flow then includes determining 443 a set of one or more attribute values 104 for each of a set of one or more attribute identifiers 102. In the depicted embodiment, this includes creating 1143 an initial list of URLs embedded in the parameters of the received HTTP request messages. For example, the AVGRFM 240 may be configured to parse the alert package to determine one or more URLs embedded within the parameters of the HTTP request messages, perhaps using another regular expression. In an embodiment, the AVGRFM looks for the URIs based upon the rule identifier of the triggered rule sent in the alert package. Additionally, in some embodiments, the AVGRFM 240 parses multiple alert packages related to possible RFI attacks in a batch manner to identify many URLs embedded within HTTP request messages.

The flow also includes filtering 444, from the set of attribute values, any values that cannot be considered indicative of an attack to create a new set of attribute values 104 for each of the set of attribute identifiers 102, which includes block 1144 where a resource identified by each of the initial list of URLs is downloaded. At 1145, each downloaded resource is matched against a set of one or more known malicious script patterns. The set of known malicious script patterns can be very simple (e.g., looking for the mere existence of any PHP/Perl/ASP code within the resource, looking for the mere existence of any JavaScript code within the resource) or quite complex (e.g., analyzing the resource to determine if particular potentially "dangerous" commands exist within the resource). At 1146, the URL for any resource that matches (or satisfies) any of the set of malicious script patterns is inserted into a list of malicious RFI URLs.

If there are URLs in the list of malicious RFI URLs (i.e., the set of attribute values 104), the set is fed back 245 for a different rule than the triggering rule that caused the reporting of the alert package. In this example, as described at block 1148 the different rule has the same category 320 and attack type 130 (i.e., RFI), but different attribute values 104 and possibly different attribute identifiers 102 and/or actions 106 as the triggering rule that caused the reporting of the alert package. For example, the triggering rule may search for an attribute value of "include" or "?" (both of which are commonly used in RFI attacks) or a specific path within a URL (e.g., "example.com") for the attribute identifier of an HTTP request message parameter, while the different rule may search for a particular URL attribute value of "http://www.example.com/examplefile.txt".

By automatically learning the URLs used in RFI attacks, the system is set to detect new attribute values for new attacks in the future, as it is known that URLs used in RFI attacks will often be used again for different RFI (or other) attacks.

FIG. 12 is a flow diagram illustrating the techniques of FIG. 4 and FIG. 10 as applied to attacks of the Cross Site Request Forgery (CSRF) attack type according to certain embodiments of the invention.

As illustrated in the flow of FIG. 12, the alert packages 224A.2 are received responsive to a triggering of a rule that is in the attack specific 322 category 320 and that is for detecting CSRF type 130 attacks. For example, assume a victim opens or views a web page that tricks the victim's HTTP client into sending HTTP request messages to a target web application server, which would cause the web application to perform an action dictated by the attacker. When the victim's HTTP client transmits a set of one or more packets carrying an HTTP request message to a web application server protected by an AD, the AD will analyze the set of packets carrying the HTTP request message by applying a set of security rules and determine that the HTTP request message is suspicious when the message meets a condition of a security rule designed to find indications of CSRF attacks (i.e., the rule is "triggered"). For example, one such security rule may trigger when a HTTP Referer header in the HTTP request message (identifying the site that caused the request to be issued) does not match the address of the destination web application server identified by the destination IP address of the packets carrying that message. When the condition of the security rule is met, the AD will transmit the alert package including the HTTP request message to the AVGRFM 240 for further analysis. In some embodiments, the alert package will include a rule identifier to identify the triggered rule(s), or may include an indicator of a potential attack type (e.g., CSRF) of the HTTP request message.

Then, in block 443, the set of attribute values 104 for each of a set of attribute identifiers 102 is determined 443 by creating 1243 an initial list of HTTP Referer header values in the HTTP request messages (i.e., web application layer messages) of the alert package(s) 224. In some embodiments, the AVGRFM 240 parses multiple alert packages identified as possible CSRF attacks in a batch manner to identify multiple Referer headers and place those in a list of identified Referer headers. When the set of attribute values 104 is filtered at block 444, all HTTP Referer header values that appear in a list of one or more known benign Referer HTTP header values are removed 1244 from the initial list of HTTP Referer header values, which forms the new set of attribute values. The list of known benign Referer HTTP headers may be configured by an administrator, learned over time based upon HTTP request messages sent between HTTP clients 210 and web application servers 230, or acquired/downloaded from a different computing device that maintains such a list.

Then, the new set of attribute values is fed back 245 when the set is non-empty for a different rule than the one that caused the reporting of the alert package. In the depicted embodiment, as described at block 1248 the different rule has the same category 320 (i.e., attack specific 322) and same attack type 130 (e.g., CSRF), but different attribute values 104 and possibly different attribute identifiers 102 and actions 160 as the triggering rule that caused the reporting of the alert package. For example, the triggering rule may detect the existence or non-existence of a particular unique token (i.e., attribute value) in an HTTP request message parameter (i.e., attribute identifier), while the different rule may search for a particular Referer header value (different attribute value) in the Referer header of the HTTP request message (different attribute identifier). As another example, the triggering rule may detect that a Referer header value in the Referer header of an HTTP request message is not associated with the target web site, while the different rule may search for the actual detected Referer header value of an HTTP request message.

FIG. 13 is a flow diagram illustrating a technique for automatically generating and feeding back attribute values of one or more attribute identifiers from packets carrying web application layer request messages for an attack of a different category than the category detected by a triggered rule according to certain embodiments of the invention. In the embodiment presented by this figure, the alert packages are received responsive to a triggering of a rule that is for a particular category 224B. After attempting to automatically generate 241 a new set of one or more attribute values for each of a set of one or more attribute identifiers, if the new set of attribute values is not empty, they are fed back 245 for a different rule than the one that caused the reporting of the alert package. This different rule has a different category 320 and different attribute values 104 than those of the triggering rule, and possibly a different attack type 130, set of actions 106, and/or set of attribute identifiers 102 than the triggering rule that caused the reporting of the alert package.

FIG. 14 is a flow diagram illustrating the techniques of FIG. 13 as applied to generating and feeding back attribute values of one or more attribute identifiers from packets carrying web application layer request messages for an attack specific rule (with a specific example related to detect RFI attacks) based upon a triggering of an attacker specific rule according to certain embodiments of the invention. In this figure, the flow begins with receipt of alert packages 224B.1 (including web application layer messages and optionally information from the packet(s) carrying the web application layer messages such as the "packet parts", triggered rule information and/or identifiers, other information from or describing other packets triggering rules, etc.) is reported responsive to a triggering (i.e., a condition being met) of a rule that is in an attacker specific 324 category 320 (in the specific example checks the source IP address of an IP header of a packet against IP addresses for which there is a strong belief that packets coming from the IP address are malicious in nature).

The flow includes, at block 443, determining a set of one or more attribute values for each of a set of one or more attribute identifiers, which in the specific example includes creating 1143 an initial list of URLs (i.e., attribute values) embedded in the parameters (i.e., attribute identifier) of the received HTTP request messages of the alert packages. The initial list is then filtered at block 444 to remove any values that cannot be considered indicative of an attack to create a new set of attribute values for each of the set of attribute IDs. In this specific example, the filtering (of URLs for an RFI attack specific rule) occurs similar to the analysis presented earlier in boxes 1144, 1145, and 1146 in FIG. 11. When a new set of attribute values is created by the filtering 444, the flow continues with block 245, where the new set of attribute values for each of the set of attribute IDs is fed back for a different rule than the attacker specific 324 triggering rule that caused the reporting of the alert package. In this specific example, as described in block 1448, the different rule is of a different category 320 than the triggering rule (i.e., attack specific 322 vs. attacker specific 324), and thus is of a different attack type 130 (i.e., RFI vs. none) and uses different attribute values 104 (i.e. URLs vs. IP addresses), and possibly different attribute IDs 102 (i.e., HTTP request message parameters vs. source IP addresses of IP headers) and actions 106 than those of the triggering rule that caused the reporting of the alert package.

FIG. 15 is a block diagram illustrating the circular evolutionary path, or "circle of life", for learning a new attack based upon a triggering of an attacker specific rule to generate a new attack specific rule, and learning a new attacker based upon a triggering of the new attack specific rule to generate a new attacker specific rule, and so on, according to certain embodiments of the invention. In embodiments of the invention, this path can be repeated continually in an iterative manner to continue the generation of attribute values for rules to protect against an evolving set of attacks and different attackers.

This iterative process begins at circle '1', wherein a set of attribute values of one or more attribute identifiers that serve to identify an attacker's HTTP client is generated or received by the AVGRFM 240. In an embodiment, the set of attribute values is a set of IP addresses for an attribute identifier 102 of a source IP address field of an IP header. The set of attribute values may be received from a computing device that maintains a list of malicious IP addresses, or generated/identified based upon a previous set of non-attackers specific rules being triggered. This set of attribute values is provided by AVGRFM 240 to ADs 220, at circle 'A', for an attacker specific 324 rule 1520, which thereby enables a set of ADs 220 to detect inbound HTTP request messages sent by any of those IP addresses.

At circle 'B.1', a first set of one or more attackers 210A-210N having IP addresses that exist within the set of attribute values used by the attacker specific rule 1520, sends web application layer request messages toward one or more web application servers (not pictured). These web application layer request messages are received and analyzed by at least one AD (e.g., 220A) but may optionally be received and analyzed at a plurality of the set of ADs (e.g., 210A-210N). Thus, attackers 210A-210N may include just one attacker 220A that sends web application layer request messages to one or multiple of the ADs 220, or the attackers 210A-210N may include multiple attackers 210A-210N that send web application layer request messages to one or a multiple of the ADs 220. Regardless, at each AD receiving these web application layer request messages the attacker specific rule 1520 is triggered, and each such AD will report one or more alert packages to the AVGRFM 240 at circle 'B.2'.

In FIG. 15, the HTTP request messages sent by the attacker(s) 210A-210N, for which the alert packages 1525 were generated because of the source IP address(es) of the attacker(s) 210A-210N are attribute values of rule 1520, includes a new/unknown attack for which a new/unknown attack pattern can be automatically learned in the form of a new set of attribute values. Using the received alert package(s) 1525, the AVGRFM 240 utilizes one or more of the processes described herein for automatically generating a new set of one or more attribute values for each of a set of one or more attribute identifiers 241, and feeding back 245 the new set for a different rule. As part of this automatic generation, in some embodiments, the AVGRFM 240 utilizes community information 1530 to generate the set of attribute values, as described with reference to FIGS. 5-8. At this point, the AVGRFM 240 has learned the attribute values of one or more attribute identifiers of the new attack, and thus transmits these attribute values for a new attack specific rule 1535, at circle 'C', either directly or indirectly (i.e., using one or more intermediate network devices) to the set of ADs 220.

After being configured to utilize the new set of attribute values for the new attack specific rule 1535, a different attacker 210X (e.g., not using an IP address within any set of IP addresses used as attribute values in any attacker specific 324 rule 1520) attempts to perform the new attack by transmitting, at circle 'D.1', web application layer messages to one or more web application servers, which are received and analyzed by a set of one or more ADs that protect those one or more web application servers. These web application layer request messages will trigger the new attack specific rule 1535 because they use attribute values 104 of one or more attribute identifiers 102 that match the condition 108 of the new attack specific rule 1535. Each of the one or more ADs receiving these web application layer request messages, will, upon determining that a web application layer request message triggers the new attack specific rule 1535, create and transmit an alert package to the AVGRFM 240 at circle 'D.2'. Upon receipt of the one or more alert packages 1540, the AVGRFM 240 will again automatically generate a new set of one or more attribute values for each of a set of one or more attribute identifiers 241, and feedback the new set of attribute values for a different rule 245. However, in this instance, the AVGRFM 240 will use the alert packages 1540 to automatically generate attribute values (i.e., the source IP address of the attacker 210X) and thus learn, at circle 'E', a new attacker for an attacker specific 324 rule. In an embodiment, the attacker specific 324 rule is the same attacker specific rule 1520 used earlier in the process, and the additional attribute value of the new attacker's 210X IP address will be added to the set of attribute values 104 of that rule, but in other embodiments a different (new or existing) rule will utilize the additional attribute value of the new attacker's 210X IP address. At this point, the process can continue iterating, where a violation of an attacker specific 324 rule leads to the automatic generation of new attribute values for a new attack specific 322 rule, which leads to the automatic generation of new attribute values for an attacker specific 324 rule, which leads to the automatic generation of new attribute values for another new attack specific 322 rule, and so on.

However, moving from an attacker specific rule to an attack specific rule is not the only possible evolution enabled by the system described herein. FIG. 16 is a state diagram illustrating many possible evolutionary paths for learning different types of security rules according to certain embodiments of the invention. In this diagram, each solid arrow illustrates a transition for which a specific example is provided in another figure, and each dashed line illustrates a transition that is enabled by the system and for which no specific example was considered necessary for one of ordinary skill in the art to comprehend the invention.

FIG. 16 includes three large circles—"Attack Specific" 322, "Attacker Specific" 324, and "Hybrid" 326—each representing a different category 320 of rule that attribute values can be learned for. As illustrated, it is possible to learn attribute values for each category 320 of rule based upon a triggering of a rule of any other category 320 of rule or even a rule of a same category. This figure, when appreciated in view of one "circle of life" idea presented of FIG. 15, illustrates how embodiments of the invention may allow for a continual, iterative process that can continue to learn new attribute values for different rules over time from iteration to iteration.

For example, attribute values for a different rule in a same category 320 can be learned for and based on attack specific 322 category rules in arrow 1608, which is further illustrated in FIG. 11 and FIG. 12; learned for and based on hybrid 326 category rules in arrow 1610, which is further illustrated in FIG. 21; and learned for and based on attacker specific 324 category rules in arrow 1612.

Similarly, from a triggering of an attack specific rule 322, the system can learn attribute values for a hybrid rule (arrow 1602 and FIG. 14) or for an attacker specific rule (arrow 1618 and depicted in a community configuration in FIG. 6). Also, from a triggering of a hybrid rule 326, the system can learn attribute values for an attack specific rule (arrow 1614 and FIG. 20) or for an attacker specific rule (arrow 1604 and FIG. 19). Likewise, from a triggering of an attacker specific rule 324, the system can learn attribute values for a hybrid rule (arrow 1616) or for an attack specific rule (arrow 1606 and FIG. 14). Several examples of these transitions are now described in further detail.

FIG. 17 is a sequence diagram illustrating one possible evolutionary path including attack specific rules, hybrid rules, and attacker specific rules according to certain embodiments of the invention. When a first attack specific rule is triggered 1710 at an AD 220, an alert package is generated and transmitted to the AVGRFM 240, which is able to automatically generate 241 a set of attribute values for each of a set of attribute identifiers to be used for a hybrid rule 1715. In this depicted example, the attack specific 322 rule detects a SQL injection attack type 130 by detecting a particular SQL query pattern, and as a result a set of attribute values including an IP address of the attacker (for an attribute identifier of a source IP address in an IP header) and a pattern including a single quotation mark (for an attribute identifier of a HTTP request message parameter in the web application layer message) for a hybrid rule is generated. This process is detailed further in FIG. 18.

Next, when the hybrid rule is triggered 1720 at the AD 220 by web application layer request messages and an alert package is sent, the AVGRFM 240 is able to automatically generate 241 several different sets of attribute values for sets of attribute identifiers (see FIG. 9 and supporting text for additional detail regarding performing multiple analysis upon one alert package). In this example, the AVGRFM 240 generates and sends for delivery to the AD 220 a set of attribute values for an attacker specific rule (e.g., an IP address), a set of attribute values for an attack specific rule (e.g., a particular automatically generated SQL query pattern), and/or a set of attributes for a hybrid rule (e.g., a User-Agent string) 1725. In the depicted example, all three sets of automatically generated attribute values may be used by three different rules 1725 at the AD 220, thereby enabling the AD 220 to detect several different types of suspicious web application layer request messages based upon a triggering of just one hybrid rule 1720. The feedback of attribute values for each of these types of rules, based upon a triggering of a hybrid rule, is further detailed in FIGS. 19, 20, and 21.

After step 1725, a new set of packets carrying a web application layer message triggers 1730 the attacker specific rule utilizing the new attribute values, as the packets included a source IP address value matching one of the IP addresses in that attacker specific rule. As a result, an alert package is generated and transmitted from the AD 220 to the AVGRFM 240, which automatically generates 241 and feeds back 1735 a set of attribute values for another attack specific rule (e.g., a particular URL to be used to detect an RFI attack), and is further detailed in FIG. 14.

FIG. 18 is a flow diagram illustrating an attack specific rule to hybrid rule evolutionary path (with a specific example related to SQL injection attacks) according to certain embodiments of the invention.

The flow begins with alert packages 224B.2 (including web application layer messages and optionally information from the packet(s) carrying the web application layer messages such as the "packet parts", triggered rule information and/or identifiers, other information from or describing other packets triggering rules, etc.) being reported responsive to a triggering (i.e., a condition being met) of a rule that is of the attack specific 322 category 320 (and, in the specific example, that is for detecting SQL injection attacks based upon pattern matching).

In the specific SQLi example, the alert packages 224B.2 may be received responsive to an attacker's HTTP client transmitting one or more packets carrying an HTTP request message (including malicious SQL syntax) that the attacker's HTTP client attempts to get the web application server to execute using its backend database. Upon receipt of the packets carrying the HTTP request message, the AD analyzes the set of packets by applying a set of security rules and determines that the HTTP request message is suspicious when it meets the condition of a security rule designed to find indications of SQLi attacks. For example, one such security rule may look for the existence of a quotation mark (i.e., a single quotation mark, an apostrophe, a double quotation mark, etc.) within a HTTP request parameter, as quotation marks can be used to modify SQL queries for SQLi attacks. Of course, many other attribute identifier and attribute value combinations are known to those of skill in the art to detect possible SQL injection attacks, including but not limited to looking for reserved SQL command names (e.g., SELECT, UPDATE, DROP, etc.) or other characters (e.g., semicolons) in HTTP request parameters. When the condition of the security rule for detecting possible SQLi attacks is met by the HTTP request message, the AD will transmit the HTTP request message, as part of an alert package, to the AVGRFM for further analysis. In some embodiments, the alert package will include a rule identifier to identify the triggered rule(s), or may include an indicator of a potential attack type (e.g., SQL injection) of the HTTP request messages.

The flow includes the same general steps as other figures—determining 443, filtering 444, and feeding back 245—however, the specific details of each differ. For example, in the determining 443 of the set of attribute values, FIG. 18 includes identifying a source IP address from the current alert package. Next, during the filtering 444 stage, the flow includes filtering 1844 the identified source IP address using a list of one or more known benign IP addresses, such that if the identified source IP address does not exist in the list, it remains eligible to be included in a new set of attribute values. In an embodiment, one or more of the IP addresses of the list of known benign IP addresses are known to be IP addresses of legitimate penetration testing services. The flow also includes analyzing the source IP address as previously described in blocks 644 and 645 of FIG. 6.

In the specific SQLi example, the AVGRFM 240 determines 443 the set of attribute values by parsing alert package(s) 224B.2, and optionally other alert packages identified as being transmitted due to the violation of a SQL injection detection rule, to identify 1843 the source IP address or addresses from the packets carrying the HTTP request messages to create an initial list of source IP addresses. In some embodiments, the alert packages include source and/or destination IP addresses from the packets, which commonly are carried in network/internet layer (OSI layer 4, TCP/IP "internet" layer) headers (e.g., IPv4 headers, IPv6 headers) of the packets. According to an embodiment of the invention, the AVGRFM 240 uses a list of benign IP addresses (e.g., those of known legitimate penetration-testing services, those configured and/or trusted by the AVGRFM 240, etc.) to filter 1844 the identified initial list of source IP addresses by removing any source IP address that appears in the benign list. Then, the remaining source IP addresses in the initial list of source IP addresses are deemed to be malicious source IP addresses.

When the new set of attribute values is not empty (e.g., source IP address(es) exist that have not been filtered out during the steps of block 444), the new attribute values are fed back for delivery to one or more ADs for a different rule 1848 that has a different category than the triggered rule (hybrid 326 vs. attack specific 322), different attribute identifiers than the triggered rule (in the specific example, both source IP address from an IP header and the HTTP request message parameters vs. only the HTTP request message parameters), and thus different values than the triggered rule (in the specific example, an IP address and a single quote mark vs. a SQL pattern), and possibly different actions (e.g., report all web application layer request messages vs. block and report web application layer request messages) than the triggered rule.

FIG. 19 is a flow diagram illustrating a hybrid rule to attacker specific evolutionary path (with a specific example related to SQL injection attacks) according to certain embodiments of the invention. The flow of FIG. 19 begins with alert packages 224B.3 being reported responsive to the triggering of a rule that is in the hybrid category (e.g., in the specific example, checks the source IP address and some other attribute [e.g., checks HTTP request parameters for a single quote mark]). FIG. 19 also includes the steps of determining 443, filtering 444, and feeding back 245; further, the steps of determining 443 and filtering 444 are the same as those steps from FIG. 18. However, the feedback 245 stage includes feeding back 1948 the set of attribute values for a different rule having a different category (attacker specific vs. hybrid) and a subset of the attribute identifiers (in the specific example, only the source IP address) and thus the same attributes for that subset of attribute IDs. The different rule may also include different actions (e.g., block and report vs. just report) than the triggering hybrid rule.

FIG. 20 is a flow diagram illustrating a hybrid rule to attack specific evolutionary path (with a specific example related to SQL injection attacks) according to certain embodiments of the invention. Just as in FIG. 19, the flow of FIG. 20 begins with alert packages 224B.3 being reported responsive to the triggering of a rule that is in the hybrid category. However, in the determining 443 step, the flow for the specific example includes determining 843 a SQL query that exists in the HTTP request message parameters of the alert package. Next, in the specific example, the filtering 444 step includes analyzing the SQL query as previously described by boxes 844, 845, and 846 from FIG. 8. Then, the feedback 245 includes determining a rule into which the new set of attribute values is to be fed back to as described in box 445 of FIG. 4. However, in this evolutionary path, the different rule has 2048 a different category (attack specific vs. hybrid) and a subset of the attribute identifiers (only the HTTP request parameters) and different attribute values for that subset of attribute IDs as compared to the triggered hybrid rule. Further, the different rule may include different actions (e.g., block and report all web application layer request messages vs. only report web application layer request messages) than the triggering hybrid rule that caused the reporting of the alert package.

FIG. 21 is a flow diagram illustrating a hybrid rule to hybrid rule evolutionary path (with a specific example related to SQL injection attacks) according to certain embodiments of the invention. The flow of FIG. 21 begins with one or more alert packages reported 224C responsive to the triggering of a first hybrid category rule. By way of the specific example and not limitation, the first hybrid rule checks for a source IP address in an IP header and also checks for a single quote mark in a HTTP request message parameter. To determine 443 the set of attribute values 104 for each of a set of attribute identifiers 102, the flow of the specific example includes determining the User-Agent string value from the HTTP request message of the alert package, as described by block 743 of FIG. 7. Next, to perform the filtering 444 of the set of attribute values, the flow of the specific example includes analyzing the User-Agent string as previously described in blocks 744, 745, and 746 of FIG. 7. Then, the new set of attribute values are fed back 245 for a different rule having 2148 the same category (hybrid) but a different attribute identifier (e.g., the User-Agent string vs. a source IP address and single quote mark) and thus different attribute values than those of the triggering first hybrid rule that caused the reporting of the alert package.

Thus, FIGS. 18-21 generally illustrate learning from attack specific to hybrid, hybrid to attacker specific, hybrid to attack specific, and hybrid to hybrid, respectively. While these general flows are further illustrated through a specific example related to SQL injection, it is to be understood that these general flows are not so limited.

FIG. 22 is a block diagram illustrating modules and stages of an automatic attribute value generation and rule feedback module (AVGRFM 240) of a set of one or more computing devices 2205 according to certain embodiments of the invention. In some embodiments, the AVGRFM 240 is part of and/or executed by one computing device 2205, but in other distributed embodiments (such as a "cloud" deployment) the functionalities of the AVGRFM 240 may be provided by multiple computing devices 2205.

In the depicted embodiment of FIG. 22, the AVGRFM 240 utilizes a set of one or more network interfaces 2207 of a set of one or more computing devices 2205 and includes an alert package reception module 2250 to receive, from one or more ADs, alert packages 224 comprising web application layer request messages sent by HTTP clients to web application servers. These web application layer request messages are to be sent by the one or more ADs responsive to sets of one or more packets that collectively carry the web application layer request messages that result in the conditions of a set of rules 150 being met. In an embodiment, these sets of packets are sent using a protocol stack including an application layer that carries web application layer request messages, a transport layer under the application layer to provide end-to-end communication services, and a network layer under the transport layer to route data supplied by the transport layer.

The AVGRFM 240, in an embodiment depicted by FIG. 22, also includes an attribute value generation module 2255 comprising a plurality of analysis modules (2210, 2215, 2220), which each may correspond to one or more of the analysis modules 910A-910Q of FIG. 9. The attribute value generation module 2255, in an embodiment, is configured to automatically generate, using the alert packages received by the alert package generation module 2250 using the set of network interfaces 2207, and without relying on a web application layer response messages that may be sent by the web application servers to the HTTP clients, new sets of one or more attribute values for sets of one or more attribute identifiers.

In the depicted embodiment of FIG. 22, the attribute value generation module 2255 includes a set of one or more attack specific analysis modules 2210, a set of one or more attacker specific analysis modules 2215, and a set of one or more hybrid analysis modules 2220; each of the sets being configured to automatically generate sets of attribute values for respective rule categories 320 (i.e., attack specific 322, attacker specific 324, and hybrid 326). Each of the plurality of analysis modules may be configured to perform tasks in one or more stages. First, some or all of the plurality of analysis modules may perform an attribute extraction stage 2225, which in some embodiments includes analyzing information from the alert packages 224 to identify possible attribute values that could be used in the new set of attribute values. The attribute extraction stage 2225 may, in an embodiment, correspond to the determining of the set of one or more attribute values for each of a set of one or more attribute identifiers as described in block 443 in FIGS. 4, 6-8, 11-12, 14, and 18-21.

Additionally, some or all of the plurality of analysis modules may perform a filtering stage 2230, which in some embodiments includes removing, from the identified possible attribute values, those values that cannot be indicative of an attack or suspicious behavior. This filtering can be based upon a variety of different factors including, but not limited to, characteristics of the current alert package (e.g., a length of a SQL query portion attribute value from an HTML request message parameter), performing a test (e.g., checking 2232 if a resource identified by a URL attribute value from an HTML request message parameter includes a malicious script pattern), performing one or more comparisons (e.g., determining if an IP address attribute value from an IP header included in the alert package exists within a "whitelist" of known benign IP addresses or IP address ranges), and/or performing an analysis based upon properties of other alert packages (e.g., determining if any other alert packages, perhaps from other ADs, include the same attribute values; determining if certain attribute values have appeared in a particular number of recently reported alert packages 224 and are thus "persistent"; determining if certain attribute values exist in other alert packages 224 from packets sent by multiple HTTP clients as identified by differing source IP addresses). The filtering stage 2230 may, in an embodiment, correspond to the filtering, from the set of attribute values, of any values that cannot be considered indicative of an attack to create a new set of attribute values for each of a set of attribute identifiers, as described in block 444 in FIGS. 4, 6-8, 11-12, 14, and 18-21.

Some or all of the plurality of analysis modules may perform a feedback stage 2235, which in some embodiments includes determining whether attribute values should be fed back to one or more ADs. The feedback stage 2235 may also include determining if the attribute values should be used with an existing rule or for a new rule, although in an embodiment one or more of the analysis modules are configured to feedback attributes to certain existing rules. Further, the feedback stage 2235 may also include determining, from multiple possible rules that could be selected, one of the possible rules depending upon characteristics of the alert package. For example, the feedback stage 2235 may include determining to feedback the new set of attribute values for a less restrictive rule when the new set of attribute values meets a criteria and determining to feedback the new set of attribute values for a more restrictive rule when the new set of attributes does not meet the criteria, or meets a different criteria.

The AVGRFM 240 also includes a transmission module 2260, which is coupled to the attribute value generation module 2255 to receive the new sets of attribute values to be fed back, and is further coupled to the set of network interfaces 2207 to transmit the new sets of attribute values for delivery to one or more of the ADs. In an embodiment, the transmission module 2260 transmits the new sets of attribute values to a distribution module 550, which may be part of the same set of computing devices 2205 or a different set of one or more computing devices at a same or different geographic location and owned by a same or different business enterprise. In various embodiments, the transmission module 2260 and/or the feedback stage 2235 may perform actions corresponding to some or all of feeding back, when the new set of attribute values of the set of attribute identifiers is not empty, the new set of attribute values for the set of attribute identifiers for a different rule than the one that caused the reporting of the alert package as described in block 245 in FIGS. 2, 4, 8, 10-14, and 18-22.

FIG. 23 is a block diagram illustrating one or more web application layer attack detectors 220A-220N according to certain embodiments of the invention. As illustrated in FIG. 2, each web application layer attack detector 220A-220N is coupled between one or more HTTP clients 210 and one or more web application servers 230 that each transmit and receive web application layer messages 260A-260B. In an embodiment of the invention, one of the ADs 220A includes one or more security gateways 2321A-2321N and a management server 2323. Each security gateway 2321 may be a web application firewall (WAF). Upon receipt of web application layer messages 260A from the set of HTTP clients 210, the security gateway 2321A will apply 2360 rules 150 that analyze web application layer request messages for potential and/or actual web application layer attacks. Upon a condition of one of the rules being met by a set of one or more packets (i.e., the rule is "triggered"), the security gateway 2321A may transmit security gateway packages 2305 to a management server 2323. In some embodiments, the security gateway packages 2305 are the same as alert packages 224 described herein, but in some embodiments the security gateway packages 2305 may include less information or more information than alert packages 224. Optionally and perhaps alternatively, the security gateway 2321A, in response to a triggering of a rule, may directly transmit 224 an alert package to the AVGRFM 240, as indicated by the dashed line.

When the management server 2323 receives a security gateway package 2305 from a security gateway 2321A, it will generate 2365 and transmit alert packages 224 to the AVGRFM 240 for automatic attribute value generation. In an embodiment of the invention, the management server 2323 will generate and transmit several alert packages 224 at one time in a "batch" mode of operation. The management server 2323, in some embodiments, during the generation 2365 of alert packages, will modify the contents of the web application layer message and/or other packet portions that triggered the rule and are to be included in the alert packages. In some embodiments, this modification removes sensitive data from those packets, such as but not limited to usernames, passwords, credit card information, unique and/or identifying session information, etc., which prevents certain sensitive information from being sent to the AVGRFM 240, which may be owned by a different business entity than the AD 220A.

When the AVGRFM 240 has received the alert packages 224 and automatically generates a new set of attribute values 104 for each of a set of attribute identifiers 102, it transmits 245 the new set of attribute values 104 back to one or more of the ADs 220A-220N for a different rule than the triggering rule that cause the reporting of the alert package. In an embodiment that is not illustrated, the new set of attribute values 104 is directly transmitted back to one or more security gateways (e.g., 2321A). In the illustrated embodiment, the new set of attributes is transmitted to the management server 2323, which optionally tracks and updates a copy of the rules 150, and then sends rule updates 2350 to one or more of the security gateways 2321A-2321N, causing the one or more security gateways to utilize the new set of attribute values while protecting the web application servers.

FIG. 24 illustrates exemplary deployment environments of a web application layer attack detector 220 including a security gateway 2321 and a management server 2323 according to certain embodiments of the invention. Specifically, FIG. 24 illustrates one or more HTTP clients 210A residing on each of one or more client end stations 2405A-2405N.

The rules 150 are shown to be hosted in a management server 2323 that is coupled to the security gateway 2321. The rules 150 (and updates to the rules 2350) may be transmitted by the management server 2323 to the security gateway 2321, or the security gateway 2321 may have a type of read access to the management server 2323 enabling it to fetch/pull the rules 150 (and/or updates to the rules 2350). The security gateway 2321 is illustrated as being communicatively coupled between the client end stations 2405A-2405N and a data center 2420. The data center 2420 includes server hardware 2425 (i.e., a computing device) on which is executing multiple web application servers (the first of which is labeled 230A). The client end stations 2405A-2405N represent client end stations that are accessing one of the web application servers 230A, and thus are accessing through a web interface. Such client end stations 2405A-2405N are typically outside of a private network of which the security gateway 2321 and data center 2420 are a part. In other embodiments, the security gateway 2321 is implemented on the server hardware 2425 separately or as part of the web application server 230A.

As previously described, the security gateway 2321 may be deployed in a variety of ways. FIG. 24 illustrates three different deployments in which the security gateway 2321 is implemented as a separate network device from the server hardware 2425. The three different deployments are as follows: 1) an inline transparent layer 2 bridge or layer 3 router 2420A in front of a switch 2445; 2) a non-inline sniffer 2420B which is connected to a switch 2445 that sits between the client end stations 2405A-2405N and the data center 2420; and 3) a reverse proxy or transparent proxy 2420C which is connected to a switch 2445 that sits between the client end stations 2405A-2405N and the data center 2420.

Alternative Embodiments

The operations in the flow diagrams have been described with reference to the exemplary embodiments of the other diagrams. However, it should be understood that the operations of the flow diagrams can be performed by embodiments of the invention other than those discussed with reference to these other diagrams, and the embodiments of the invention discussed with reference these other diagrams can perform operations different than those discussed with reference to the flow diagrams.

Similarly, while the flow diagrams in the figures show a particular order of operations performed by certain embodiments of the invention, it should be understood that such order is exemplary (e.g., alternative embodiments may perform the operations in a different order, combine certain operations, overlap certain operations, etc.).

While the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting.

What is claimed is:

1. A method in a computing device communicatively coupled to a web application layer attack detector (AD), wherein the AD is communicatively coupled between a Hypertext Transfer Protocol (HTTP) client and a web application server to protect the web application server against web application layer attacks, wherein the AD applies rules that each comprise a condition including a set of one or more attributes, wherein each of the set of attributes includes an attribute identifier and a set of one or more attribute values, the method comprising:
   automatically learning a new condition to detect a first type of web application layer attack by,
      receiving, from the AD, an alert package comprising a web application layer request message sent by the HTTP client to the web application server, wherein the alert package was sent responsive to a set of one or more packets that collectively carried the web application layer request message and that resulted in the condition of one of the rules being met, and wherein the one of the rules is an attack specific rule that relies on a set of attribute values that is indicative of the first type of web application layer attack, wherein the set of packets are sent utilizing a protocol stack including the application layer that carries web application layer messages, a transport layer under the application layer to provide end-to-end communication services, and a network layer under the transport layer to route data supplied by the transport layer,
   automatically generating, using the received alert package, a new set of one or more attribute values for each of a set of one or more attribute identifiers, and
   transmitting, for delivery to the AD, the new set of attribute values for each of the set of attribute identifiers to form the new condition for a different rule than the one of the rules that caused the sending of the alert package, wherein the new condition for the different rule is to be used in the AD's protection of the web application server against web application layer attacks from the HTTP client or any other HTTP client, and wherein the different rule is another attack specific rule that relies on the new set of attribute values for the set of attribute identifiers that is indicative of the first type of web application layer attack.

2. The method of claim 1, further comprising:
   receiving a second alert package comprising a second web application layer request message, wherein the second web application layer alert package was sent responsive to a second set of one or more packets that collectively carried the second web application layer request message and that resulted in the condition of the different rule being met;
   automatically generating, using the second alert package, a second new set of one or more attribute values for each of a second set of one or more attribute identifiers;
   transmitting the second new set of attribute values for each of the second set of attribute identifiers for another rule.

3. The method of claim 2, wherein the second alert package is received from a different AD owned by a different business enterprise than a business enterprise that owns the AD.

4. The method of claim 3, wherein the second set of packets were sent by a different HTTP client to a different web application server that is protected by the different AD.

5. The method of claim 1, wherein the alert package further comprises at least one of:
   an Internet Protocol (IP) address from the set of packets;
   a port identifier from the set of packets; and
   an identifier of the one of the rules.

6. The method of claim 1, wherein said automatic generating of the new set of attribute values comprises:
   transmitting a request to retrieve a resource identified by the web application layer request message of the alert package, wherein the resource is external to the AD and the web application server;
   receiving the resource; and
   determining whether the resource is malicious.

7. The method of claim 1, wherein the first type of web application layer attack is a Remote File Inclusion (RFI) attack.

8. The method of claim 7, wherein said automatic generating of the new set of attribute values comprises:
downloading a resource identified by a Uniform Resource Identifier (URI) within the web application layer request message to determine whether the resource includes a malicious script pattern.

9. The method of claim 1, wherein the first type of web application layer attack is a Cross-Site Request Forgery (CSRF) attack.

10. The method of claim 9, wherein said automatic generating of the new set of attribute values comprises:
determining whether a HTTP Referer header within the web application layer request message exists within a set of one or more known benign HTTP Referer headers.

11. A computing device to be communicatively coupled to a web application layer attack detector (AD), wherein the AD is to be communicatively coupled between Hypertext Transfer Protocol (HTTP) clients and a set of one or more web application servers to protect the set of web application servers against web application layer attacks, wherein the AD is to apply rules that each comprise a condition including a set of one or more attributes, wherein each of the set of attributes includes an attribute identifier and a set of one or more attribute values, the computing device comprising:
a set of one or more network interfaces; and
an automatic attribute value generation and rule feedback module coupled to the set of network interfaces and configured to automatically learn new conditions to detect a first type of web application layer attack, the automatic attribute value generation and rule feedback module comprising,
an alert package reception module configured to receive, from the AD, alert packages that each comprise a web application layer request message sent by one of the HTTP clients to one of the web application servers, wherein the alert packages are to each be sent responsive to a set of one or more packets that collectively carried the web application layer request message and that result in the condition of one of the rules being met, and wherein the one of the rules is an attack specific rule that relies on a set of attribute values that is indicative of the first type of web application layer attack, wherein each of the sets of packets are to be sent utilizing a protocol stack including the application layer that carries web application layer messages, a transport layer under the application layer to provide end-to-end communication services, and a network layer under the transport layer to route data supplied by the transport layer,
an attribute value generation module configured to automatically generate, using the received alert packages, new sets of one or more attribute values for sets of one or more attribute identifiers, and
a feedback module configured to transmit, for delivery to the AD, the new sets of attribute values for the sets of attribute identifiers to form the new conditions for different rules than the attack specific rules that caused the sending of the alert packages, wherein the new conditions for the different rule are to be used in the AD's protection of the web application servers against web application layer attacks from the HTTP clients or any other HTTP client, and wherein the different rules are additional attack specific rules that are to rely on the new sets of attribute values for the sets of attribute identifiers that are indicative of the first type of web application layer attack.

12. The computing device of claim 11, wherein:
the alert package reception module is further configured to receive additional alert packages comprising additional web application layer request messages, wherein the additional web application layer alert packages are to be sent responsive to additional sets of one or more packets that collectively carry the additional web application layer request messages and that result in the conditions of the different rules being met;
the attribute value generation module is further configured to automatically generate, using the additional alert packages, additional new sets of one or more attribute values for additional sets of one or more attribute identifiers; and
the feedback module is further configured to transmit the additional new sets of attribute values for the additional sets of attribute identifiers for other rules.

13. The computing device of claim 12, wherein the additional alert packages are to be received from a set of one or more different ADs owned by a set of one or more business enterprises that are different than a business enterprise that owns the AD.

14. The computing device of claim 13, wherein the additional sets of packets are to be sent by a set of one or more different HTTP clients to one or more web application servers protected by the different AD that are not of the set of web application servers protected by the AD.

15. The computing device of claim 11, wherein one of the alert packages is to further comprise at least one of:
an Internet Protocol (IP) address from the set of packets that caused the one alert package to be sent;
a port identifier from the set of packets that caused the one alert package to be sent; and
an identifier of the rule having the condition that was met that caused the one alert package to be sent.

16. The computing device of claim 11, wherein the attribute value generation module is to automatically generate the new sets of attribute values by being configured to:
transmit requests to retrieve resources identified by the web application layer request messages of the alert packages, wherein the resources are external to the AD and the web application servers;
receive the resources; and
determine whether the resources are malicious.

17. The computing device of claim 11, wherein the first type of web application layer attack is a Remote File Inclusion (RFI) attack.

18. The computing device of claim 17, wherein the attribute value generation module is to automatically generate the new sets of attributes by being configured to download resources identified by Uniform Resource Identifiers (URIs) within the web application layer request messages to determine whether the resources include malicious script patterns.

19. The computing device of claim 11, wherein the first type of web application layer attack is a Cross-Site Request Forgery (CSRF) attack.

20. The computing device of claim 19, wherein the attribute value generation module is to automatically generate the new sets of attributes by being configured to determine whether HTTP Referer headers within the web application layer request messages exist within a set of one or more known benign HTTP Referer headers.

* * * * *